Nov. 12, 1957 L. H. REAGAN 2,813,153

INTERTOLL TRUNK CIRCUIT

Filed Aug. 11, 1953 9 Sheets-Sheet 1

INVENTOR.
LEON H. REAGAN
BY J. Warren Whitesel
ATTORNEY

Nov. 12, 1957 L. H. REAGAN 2,813,153

INTERTOLL TRUNK CIRCUIT

Filed Aug. 11, 1953 9 Sheets-Sheet 2

Nov. 12, 1957 L. H. REAGAN 2,813,153

INTERTOLL TRUNK CIRCUIT

Filed Aug. 11, 1953 9 Sheets-Sheet 3

Nov. 12, 1957 L. H. REAGAN 2,813,153

INTERTOLL TRUNK CIRCUIT

Filed Aug. 11, 1953 9 Sheets-Sheet 4

INTERTOLL TRUNK CIRCUIT 111

ADAPTER CIRCUIT 112

DIAL TRIBUTARY TRUNK CIRCUIT 115

DIAL TRIBUTARY TRUNK CIRCUIT 115

Nov. 12, 1957 L. H. REAGAN 2,813,153

INTERTOLL TRUNK CIRCUIT

Filed Aug. 11, 1953 9 Sheets-Sheet 8

Nov. 12, 1957 L. H. REAGAN 2,813,153

INTERTOLL TRUNK CIRCUIT

Filed Aug. 11, 1953 9 Sheets-Sheet 9

2,813,153

INTERTOLL TRUNK CIRCUIT

Leon H. Reagan, Richland, Wash., assignor, by mesne assignments, to General Dynamics Corporation, a corporation of Delaware Application August 11, 1953, Serial No. 373,537

30 Claims. (Cl. 179—27)

This invention relates to electro-mechanical telephone systems and more particularly to adapter circuits for interconnecting dissimilar systems. One of the systems may use polar-duplex signaling of the type shown in my copending application Serial No. 308,240, filed September 6, 1952, now Patent No. 2,726,285, assigned to the same assignee as the present invention, now Patent 2,726,285, issued December 6, 1955.

In recent years the telephone industry has started a program for placing in operation certain equipment which will provide means whereby a number may be dialed for seizing any distant subscriber over a nation-wide intertoll dialing network. As this program progresses, certain offices are provided with the new intertoll dialing equipment and these offices must work into other offices which are still using old facilities. Therefore, it is necessary to insert a temporary adapter which will take signals transmitted from the new equipment and convert these signals to those which may be used by the old facilities. Conversely, the adapter must return whatever recognization signals may be required by either the old or new equipment before it proceeds to its next operation.

One object of my invention is to provide means for interconnecting two dissimilar telephone systems.

Another object is to provide an adapter for converting either of two sets of signals into the other of the two sets of signals.

A further object of this invention is to provide all recognization signals which may be required by either of two systems before it proceeds to its next stage of operation.

Still a further object of this invention is to provide means for adapting polar-duplex or composite equipment to work into a ring-down switchboard.

In general, this invention accomplishes the above cited objects by providing means for adapting a manual office for use in connection with another office provided with intertoll dialing facilities. At some future date, the manual office also may be provided with intertoll dialing equipment at which time the adapters will be removed and discarded. Hence, it is seen that the present invention provides an inexpensive means for adapting two dissimilar telephone offices for interconnection during the period of installation and changeover to dial equipment.

Figure 6:
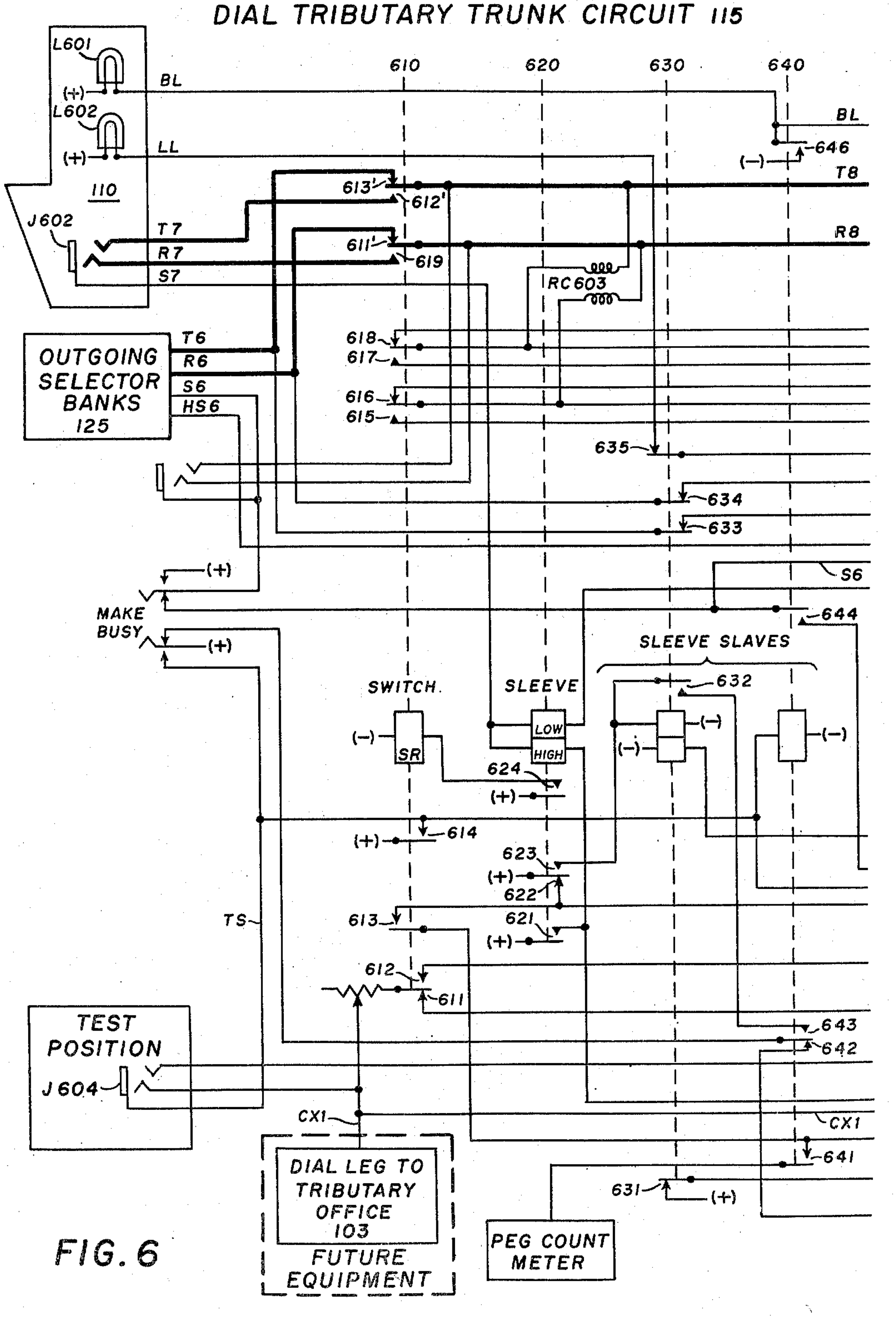
Figure 7:
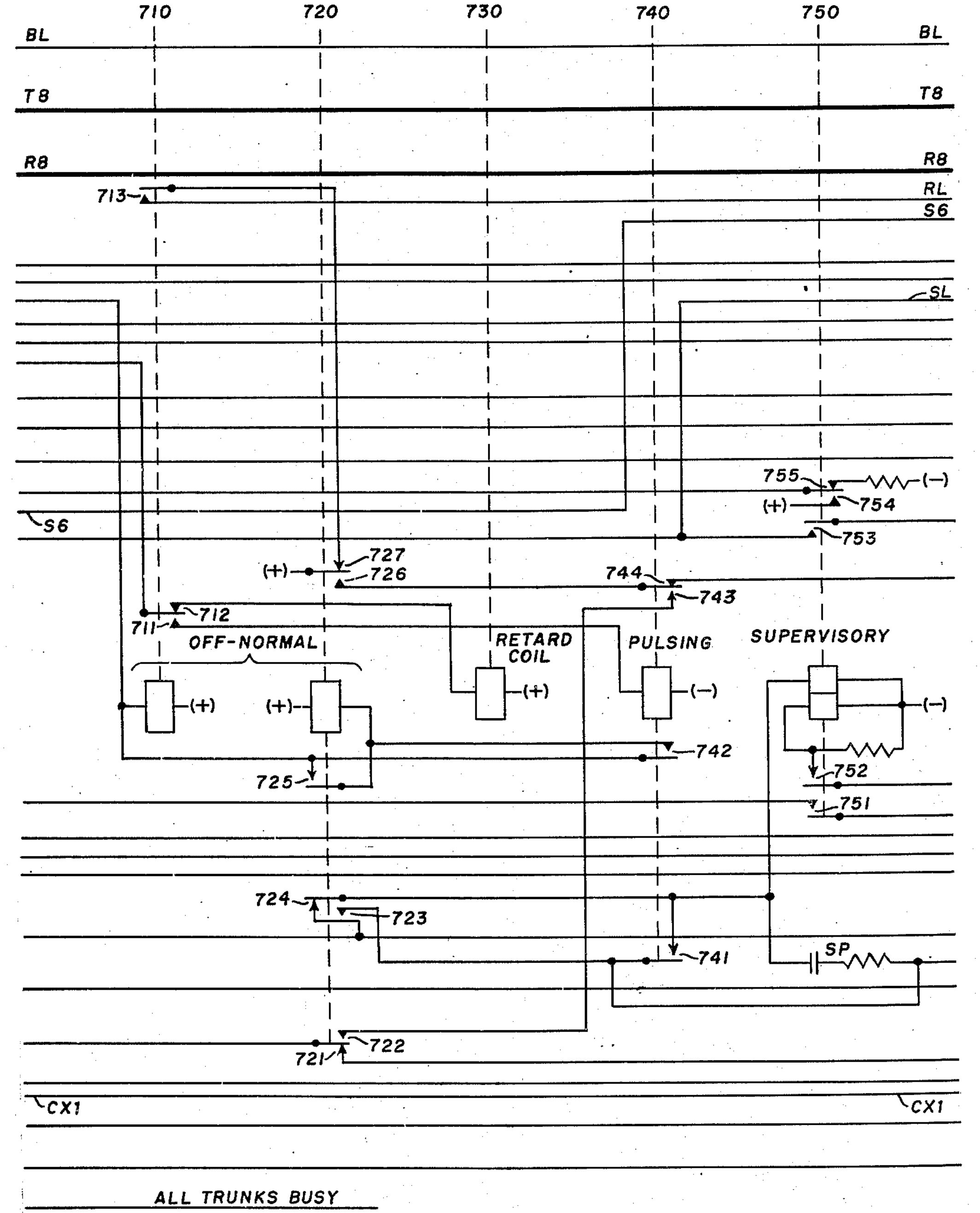
Figure 8:
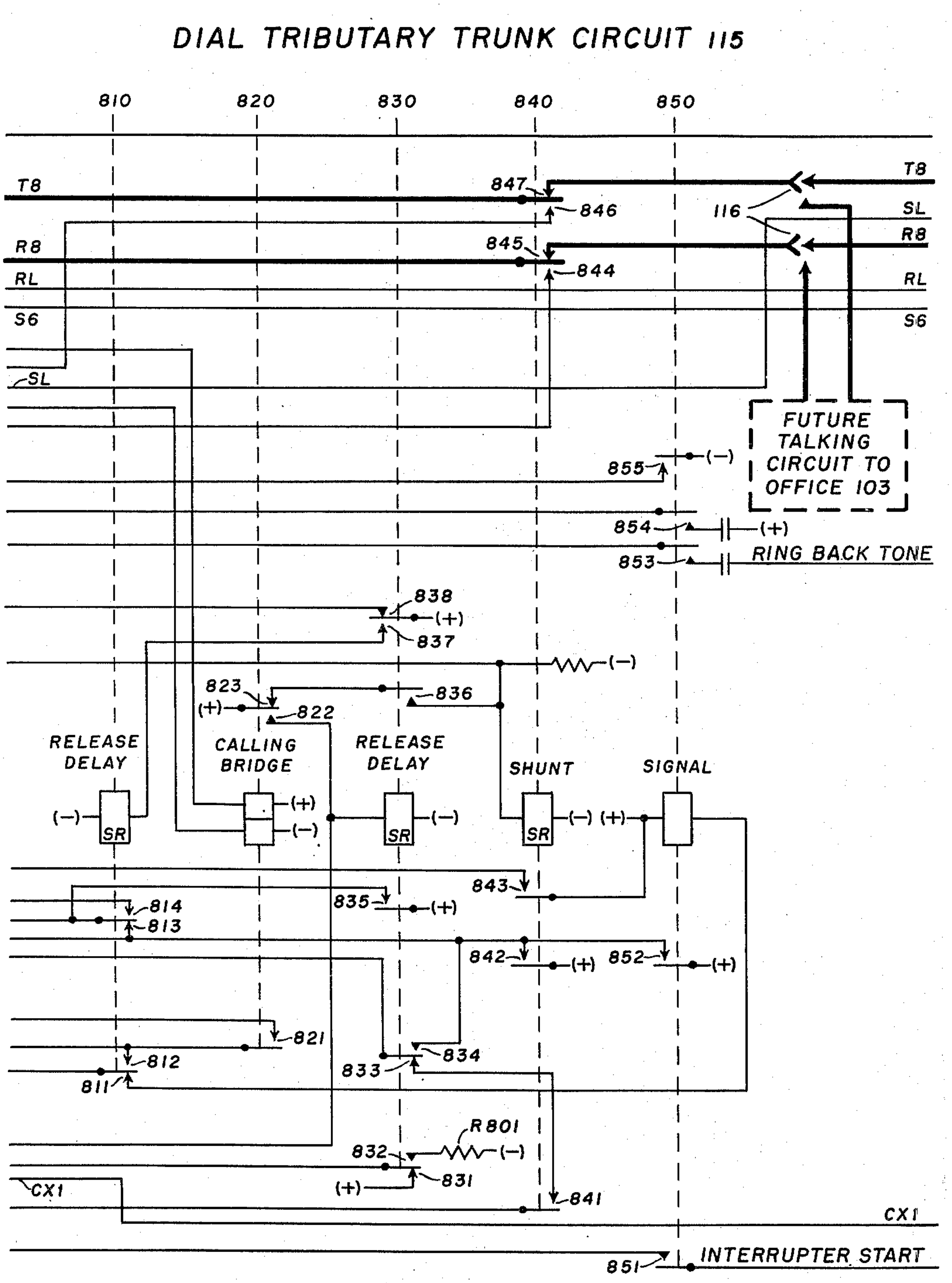
Figure 9:
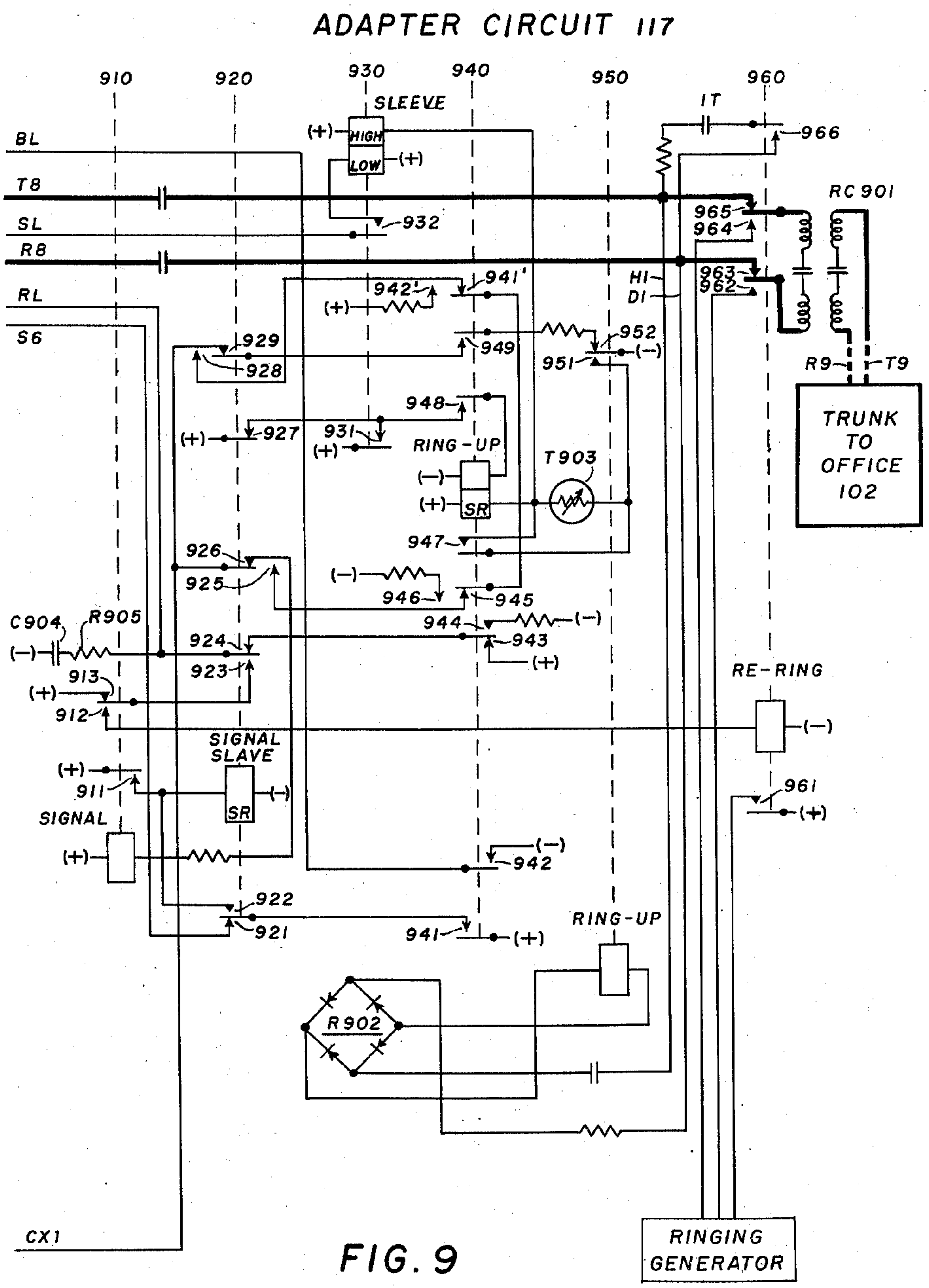

Figs. 6–8 give details of dial tributary trunk circuit 115;

Fig. 9 shows the arrangement of adapter 117; and

Figures 1, 10:
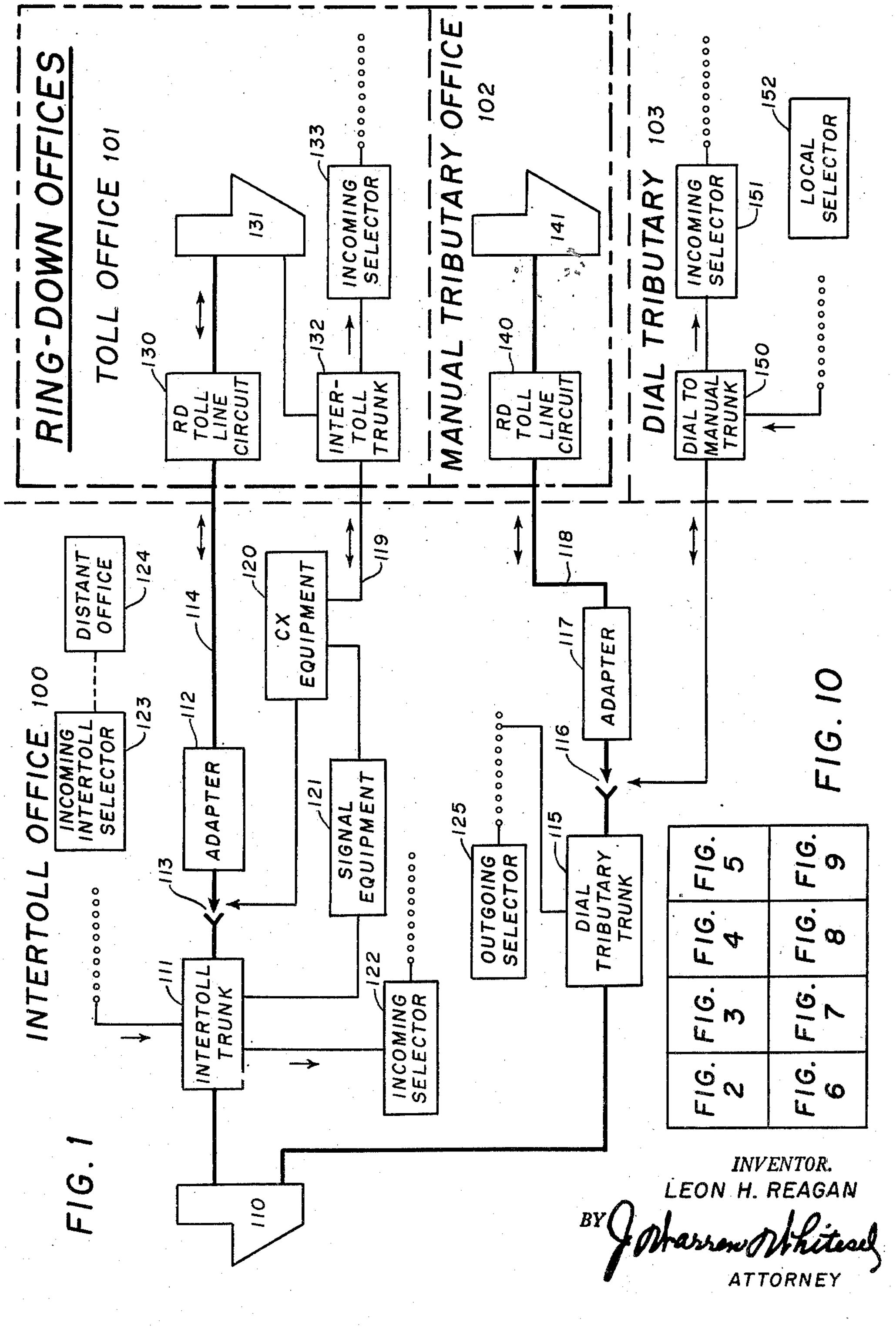
Fig. 1 shows in block diagram form one embodiment of my invention.

Fig. 10 shows how Figs. 2–9 should be arranged to provide a complete understanding of the invention.

Conventionally, telephone systems may be energized from a common battery located at some central point. Since the positive terminal of this battery is usually connected to ground, the expressions "grounded (+)" and "(−) battery" are used hereinafter to describe such a conventional arrangement. However, it should be understood that any suitable source of potential may be used without changing the scope of this invention.

GENERAL DESCRIPTION

This invention is applicable to several conditions. One condition concerns calls before the complete installation of intertoll dialing facilities, as during the installation of intertoll equipment, or when, by choice, manual and intertoll dial equipment are mixed, for examples; and the other condition involves calls after the complete installation of intertoll dial facilities. That is, intertoll trunk circuit 111 may be installed and calls may be extended therethrough to a distant office, such as 101, for example. If the intertoll dial network at the distant office is not yet complete, the call is by way of adapter 112 and the heavily inked conductors in Fig. 1; while if the distant office is completely equipped for intertoll operation, the call is by way of CX equipment 120, signal equipment 121 and the lightly inked conductors. Since intertoll trunk circuit 11 operates in the same manner without regard as to whether the call is by way of adapter 112 or CX equipment 120, the description hereinafter will proceed by first explaining how trunk circuit 111 operates under all possible interconnections. During this part of the description, it is assumed that conductor W (Fig. 4) is used in place of conductors SL and SL–1. Then the specification will describe how these operations may affect adapter 112. During this part of the description, it is assumed that conductor W is discarded and that conductors SL and SL–1 are used.

The remarks in the preceding paragraph as to intertoll trunk circuit 111 and adapter 112 apply equally to calls through dial tributary trunk circuit 115 and adapter 117. In a similar manner, the description of these circuits will proceed by first explaining the operation of dial tributary trunk 115 under all call conditions; then, the description will explain how adapter 117 may be affected by such operations.

The term "dial-to-dial trunk circuit" is applied to both of the trunk circuits 111 and 115 hereinafter because each provides means for repeating dial pulses from one end of a trunk line to telephone equipment at the other end of a trunk line. For example, in the future, dial pulses may be extended either from operator position 110 or from selector 123 through trunk circuit 11 to selector 133; or, dial pulses may be extended from operator position 131 to incoming selector 122 via trunk circuit 111. Trunk circuit 115 neither receives nor repeats dial pulses on calls from dial tributary office 103 to intertoll office 100; nevertheless, it is thought that dial tributary trunk circuit 115 may be called a dial-to-dial trunk circuit because dial pulses may be extended either from operator position 110 or from outgoing selector 125 to tributary office 103.

Trunk lines 114 and 118 are called two-way trunk lines hereinafter because calls may be extended in either direction thereover.

Figure 4:
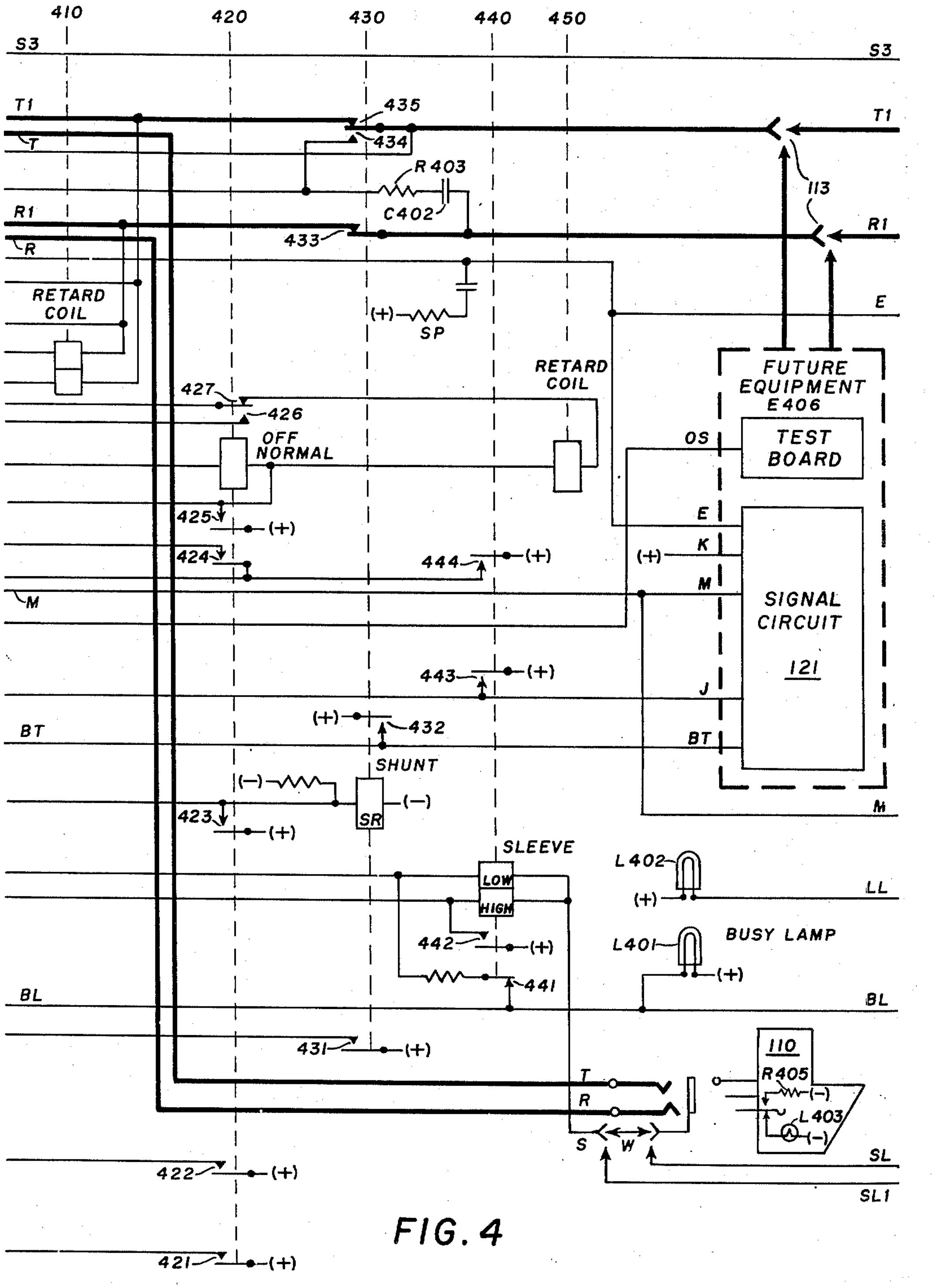

The first call to be described will be one extended from operator position 110 through intertoll trunk circuit 111 to distant dial equipment by way of intertoll trunk circuit 132, for example see Sections 1–7 below. In this arrangement, the operator of Fig. 4 is connected by way of intertoll trunk circuit 111 and the call is extended over conductors T1 and R1 to future equipment E406 which may lead to conductor 119 of Fig. 1, for example. Future signal equipment 121 may be used to provide signaling to incoming selector 133.

The second call to be described extends from intertoll trunk circuit 132 to operator position 110, for example, see the specification below, Sections 8–11. In the circuit drawings this call extends from future equipment E406 in Fig. 4 to operator 110 in Fig. 4.

Figure 2:
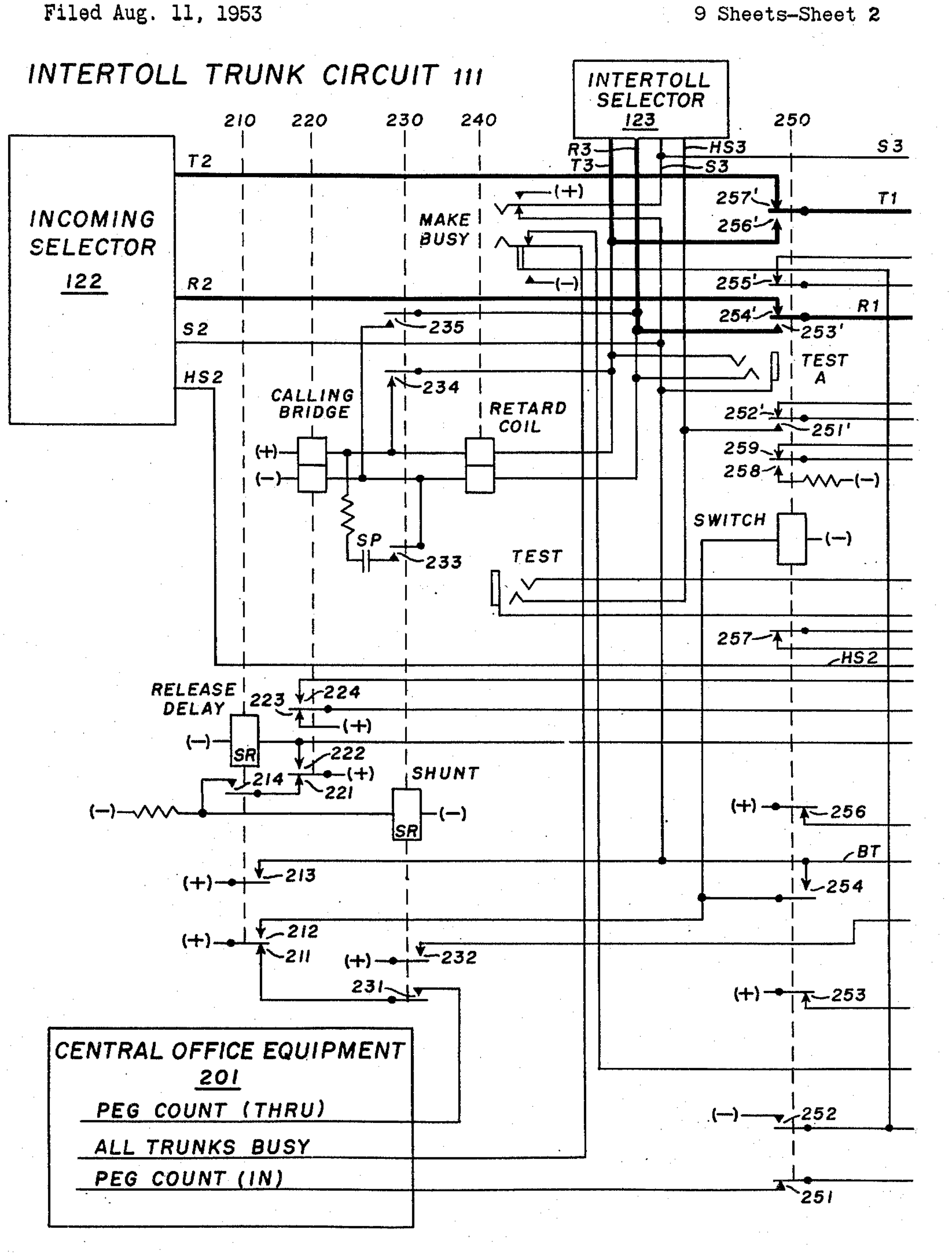
Figs. 2–4 show details of intertoll trunk circuit 111.
Figure 3:
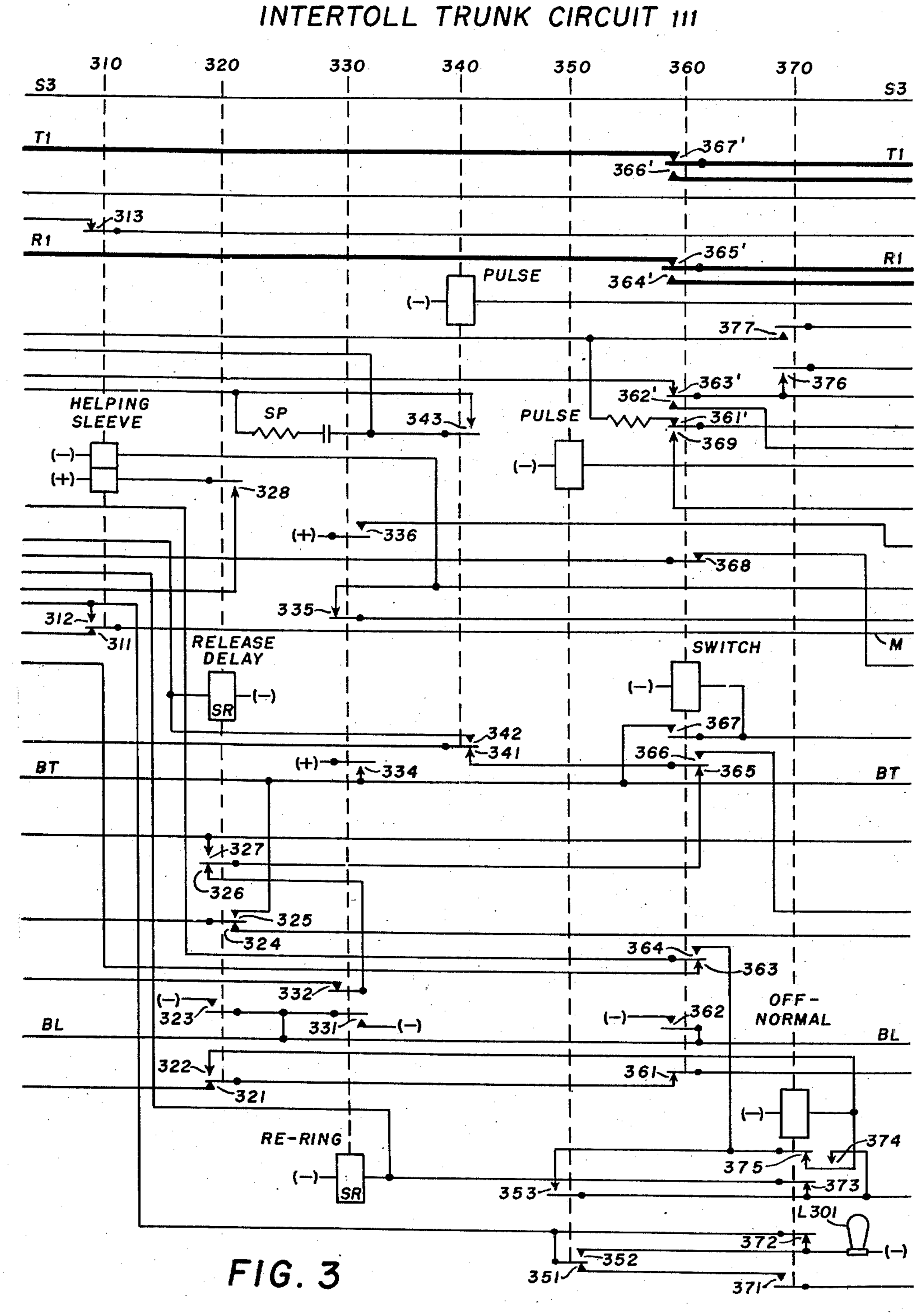

The third call to be described will be one from intertoll selector 123 in Fig. 2 through future equipment E406 to intertoll trunk circuit 132 which is described below in Sections 12–16.

Following this there is a description of how these calls may be routed through adapter 112 to provide temporary service to a ring-down toll line circuit 130 in Sections 17–19.

A similar procedure is adopted with respect to dial tributary trunk 115 in that the first call will be one extended from dial to manual trunk circuit 150 to dial tributary trunk circuit 115, while the second call to be described is the outgoing call from operator position 110 to dial to manual trunk 150 by way of dial tributary trunk 115. In describing these calls, use will be made of Figs. 6–8 wherein operator position 110 is in the upper left corner of Fig. 6 and the circuit extending to adapter 117, and dial to manual trunk 150 is by way of conductors T8 and R8 in the upper right corner of Fig. 8.

The next call condition to be described is one from outgoing selector 125 to dial to manual trunk circuit 150. Following this there is a description of how adapter circuit 117 is used to provide interim operation prior to the installation of dial tributary office 103.

One of the chief differences between adapter 112 and adapter 117 is the type of signaling to which each is responsive. For example, adapter 112 works into a polar-duplex signaling trunk circuit. A signal circuit such as this uses a polar relay which is responsive to both the magnitude and direction of current flow. This requires an expensive relay having more than usual sensitivity. Signaling is over a single metallic dial leg. Signals are sent by changing the potential on the M conductor thus operating a polar relay at the distant end but not at the near end. Signals are received by the appearance or removal of ground on the E conductor by the polar relay on the near end. On the other hand, adapter 117 works into a positive-negative signaling circuit. This type of signaling requires two relays of usual characteristics at either end of a dial leg. The signal is determined by the potential applied to conductor CX1 by the distant end plus the direction and stage of the particular call reached by the time of signaling. That is, with contacts 611 closed, signals from the distant office operate relay 850; whereas, wtih contacts 612 closed, (—) battery applied through relay 750 operates a relay at the distant end. Polar-duplex signaling eliminates the need for contacts such as 611 and 612.

It is thought that "polar-duplex" and "positive-negative" signaling are terms of art which need no further explanation, but are well known to those skilled in the art.

*Sec. 1. Outgoing call from switchboard 110 to trunk circuit 132*

After operator 110 (Fig. 4) has taken position she may proceed to seize intertoll trunk circuit 111 preparatory to the extension of a call to intertoll trunk circuit 132 via future equipment E406. To seize intertoll trunk circuit 111 (Figs. 2–4), the operator at position 110 (Fig. 4) makes a suitable plug and jack connection at which time (—) battery is supplied over conductor S to operate sleeve relay 440 which prepares trunk circuit 111 and locks out other equipment by suitable busy markings. That is, (—) battery over the W wiring and conductor S completes a circuit through the high resistance winding of sleeve relay 440 and through contacts 324 and 253 to grounded (+). Sleeve relay 440 operates closing contacts 442 to complete a locking circuit whereby the sleeve relay is held dependent solely upon continuity of (—) battery over conductor S. Contacts 443 close an obvious circuit for operating switch relay 360 and for marking the "J" conductor, which has no effect at this time. At contacts 444, a circuit is completed for energizing helping sleeve relay 310, the path being completed from grounded (+) by way of contacts 444 and 335 to (—) battery through the upper winding of relay 310. Switch relay 360 operates to extend talking conductors T1 and R1 to the operator position over a circuit which may be traced from conductor T1 through contacts 435 and 366' to conductor T and from conductor R1 through contacts 433 and 364' to conductor R. At contacts 365' and 367', a talking circuit is opened since this circuit has no use in this call. Switch relay 360 also connects (—) battery at contacts 362 to hold busy lamp L401 lit by way of conductor BL and also to provide an audible busy signal through contacts 441 and the low resistance winding of relay 440 to conductors S, W and the various operator's positions.

The trunk line is normally provided with an idle line termination to maintain a suitable condition for the benefit of carrier and repeater equipment, if any; therefore, it is necessary to remove this termination when the trunk circuit is taken into use. Helping sleeve relay 310 operates over the circuit from (—) battery through the upper winding of relay 310 to contacts 335 and 444 to grounded (+). The idle line termination extending from conductor R1 through capacitor C402, resistance R403, contacts 313 and 255' to conductor T1 is removed at contacts 313 by helping sleeve relay 310.

The M conductor is used to control signal circuit 121 to transmit indications to the distant office. That is, the M conductor is switched between ground and resistance battery which is effective to transmit polar-duplex signals in a conventional manner as taught in my copending application, Serial No. 308,240, filed September 6, 1952, now Patent 2,726,285. Therefore, the M conductor is transferred from grounded (+) normally extended through contacts 311 and 223 to a (—) battery marking extended by way of resistance lamp L301 and contacts 372 and 312. This change of the M wire marking serves to transmit a seizure signal in accordance with the stage to which the call has progressed.

Each time that a trunk circuit becomes busy, a multiple ground marking is removed from the all trunks busy conductors; as the last ground marking is removed, a suitable meter is operated to register an overflow condition. Hence, switch relay 360 is provided with contacts 365 by means of which a circuit is opened to the all trunks busy conductor thereby indicating that another trunk circuit is in use. The circuit was formerly completed from grounded (+) on contacts 256 through contacts 341, 365, 326 and 332 to the all trunks busy conductor by way of the make busy key.

Since operation of switch relay 360 marks the time that the operator may prepare for dialing, it is necessary to give an indication of this fact. Therefore, at contacts 366, switch relay 360 completes an alternate holding path for sleeve relay 440 over the circuit extending from ground (+) through contacts 256, 341, 366 and the upper low resistance winding of sleeve relay 440 to (—) battery connected to conductor S by the operator's plug and jack connection and lamp L403. It might be noted that the upper winding of sleeve relay 440 is of low resistance and the lower winding is of high resistance; therefore, the application of a grounded (+) marking through the upper winding of relay 440 is used to light marginal supervisory lamp L403. It indicates to the operator that she may prepare for dialing.

*Sec. 2. Prepare for dialing*

Upon noting lighted supervisory lamp L403, operator 110 (Fig. 4) prepares to transmit digit pulse signals for the purpose of setting switches in a distant office, incoming selector 133, for example. Therefore, she operates a key (not shown) which extends resistance battery over her plug and jack connection to conductor T through closed contacts 366', through the lower winding of retard coil 410, contacts 369, the winding of off-normal relay 420, retard coil 450, contacts 427 and 362′ to conductor R by way of the upper winding of retard coil 410 and contacts 364′. Off-normal relay 420 opens contacts 427 and closes contacts 426 thereby shifting the circuit extending through contacts 362′, retard coil 410 and contacts 364′ to pulse relay 350 which operates. Contacts 423 close an obvious circuit for operating shunt relay 430 which in turn completes a circuit from conductor T1 through contacts 434 and idle line termination R403 and C402 to conductor R1. This circuit prevents unbalance of the carrier or repeater equipment, if any, during dial pulsing which is to follow. At contacts 432, a circuit is completed by shunt relay 430 for marking the busy conductor BT. Shunt relay 430 also opens contacts 433 and 435 to remove a repeat coil in future equipment E406 corresponding to RC501 from its normal connection with conductors T1 and R1 thereby reducing possible impulse distortion. A circuit is completed to operate off-normal relay 370 over the path extending from grounded (+) through contacts 422, 353 and 375 to (—) battery by way of the winding of off-normal relay 370. Off-normal relay 370 opens contacts 372 which formerly connected a (—) battery marking through resistance lamp L301 to the M conductor. Now (—) battery is extended through resistance lamp L301 and by way of operated contacts 352 and 312 to the M conductor. The purpose of this operation is to place the M conductor directly under the control of pulse relay 350 at contacts 352. Off-normal relay 370 closes a holding circuit for itself at contacts 374 so that it will not release if pulse relay 350 restores to open contacts 353. A circuit is completed at contacts 376 for shunting retard coil 410 from its normal connection thereby providing for direct metallic control of pulsing relay 350 over a path extending from (—) battery through the winding of pulse relay 350, closed contacts 426, 362′, 376 and 364′ to conductor R.

*Sec. 3. Dialing*

The circuit is now in condition to repeat digit pulses; therefore, the operator may transmit suitable pulses over conductor R, each pulse comprising a break in the grounded (+) marking normally extending thereover. On each break period, pulse relay 350 releases closing contacts 351 and on each make period, pulse relay 350 reoperates closing contacts 352. On each release (contacts 351 closed), a grounded (+) marking is extended through contacts 421, 371, 351 and 312 to the M conductor and signal circuit 121 which extends the transmission of control pulses to the distant exchange. Each time the pulse relay 350 operates (contacts 352 closed), a circuit is completed from (—) battery through resistance lamp L301 and contacts 352 and 312 to the M conductor and the distant office. Off-normal relay 370 does not release during pulsing since it is held over its own locking contacts 374 to grounded (+) at contacts 422. Following the last pulse in each pulse train, relay 350 remains operated to continue application of the resistance battery marking to the M conductor via contacts 352 and 312 for a period of time which is longer than a normal pulse thereby signaling the distant end that a complete pulse train has been transmitted.

Following transmission of the last digit pulse train, the operator returns her dial key to normal thereby removing (—) battery from conductor T releasing off-normal relay 420 which previously held operated over the circuit extended from grounded (+) on operated contacts 425 through the winding of off-normal relay 420, closed contacts 369, the lower winding of retard coil 410, operated contacts 366′, and tip conductor T to operator position 110 and (—) battery (not shown). Upon restoring, off-normal relay 420 opens contacts 426 thereby releasing pulse relay 350 which had been holding over contacts 426, 362′, 376 and 364′ to grounded (+) applied to conductor R by the dial key at position 110. Shunt relay 430 releases when contacts 423 open. Idle line termination C402 and R403 is removed at contact 434 and the repeat coil in future equipment E406 is again connected to conductors T1 and R1. A circuit for holding off-normal relay 370 is opened at contacts 422 and the shunt around retard coil 410 is removed responsive to the opening of contacts 376 and 377 to reconnect it across the tip T1 and ring R1 conductors over a circuit including retard coil 410, contacts 369, off-normal relay 420, retard coil 450, contacts 427 and 362′ and retard coil 410. Contacts 372 close to complete a path from (—) battery through resistance lamp L301 to the M conductor via contacts 312 so that when pulse relay 350 releases to open contacts 352 the polarity of the M conductor will not be reversed.

*Sec. 4. Called party answers*

Equipment attached at the distant office—for example, incoming selector 133 and its associated switch train—operate under the influence of the dial pulses to seize and signal the called party. The called party answers by removing his handset thereby causing a connection of grounded (+) to mark the E conductor to operate pulse relay 340 over an obvious circuit. Pulse relay 340 opens contacts 341 thereby removing the grounded (+) marking extended from contacts 256 which had been previously extended through contacts 366 and the low resistance winding of sleeve relay 440. Since the only marking now applied to sleeve conductor S is by way of the high resistance winding of relay 440, marginal lamp L403 connected to conductor S by way of wire W is extinguished thereby giving the operator answer supervision. Responsive to the operation of pulse relay 340, contacts 342 are closed to complete a circuit from grounded (+) on contacts 256 for operating release delay relay 320. Relay 320 operates to prepare a circuit for shunt relay 430 at contacts 327; however, relay 430 does not operate at this time since contacts 365 are open. A circuit is completed at contacts 325 for providing an alternate holding path to switch relay 360 over contacts 253, 325 and 367. These contacts also complete a circuit for applying an alternate ground marking to conductor BT. At contacts 324, an alternate circuit from grounded (+) through contacts 253 is removed from connection with the high resistance winding of sleeve relay 440; however, it remains operated due to its locking path over contacts 442. Conversation follows by way of conductors T1, R1, and conductors T and R.

*Sec. 5. Release*

If the called party disconnects first, he replaces his receiver and a ground marking is removed from the E conductor thereby releasing pulse relay 340. Contacts 342 open responsive to the restoration of relay 340 to restore release delay relay 320 which in turn opens contacts 325 thereby removing a ground marking from conductor BT and opening one of the holding circuit to switch relay 360 which had been completed through contacts 367. Contacts 341 are closed thereby extending a grounded (+) marking through contacts 256, 341 and 366 to sleeve conductor S and the W wiring by way of low resistance winding of sleeve relay 440. This low resistance connection is sufficient to light marginal supervisory lamp L403 at operator's position 110 (Fig. 4) thereby giving disconnect supervision.

The operator observes the marginal supervisory lamp and proceeds to disconnect her plug and jack connection. Responsive thereto, sleeve relay 440 releases and contacts 443 open to break the last holding path for switch relay 360. It releases to disconnect conductors T1 and R1 from conductors T and R. Contacts 365 reconnect grounded (+) from contacts 256, 341 and 365 to the all trunks busy conductor by way of contacts 326, 332 and the make busy key as an indication that at least one trunk circuit is now idle.

*Sec. 6. Calling party disconnects first*

If the calling party is the first to replace his receiver, the operator at position 110 (Fig. 4) receives a suitable signal (not shown) and proceeds to disconnect the plug and jack connection thereby breaking the circuit to sleeve relay 440 which formerly extended from conductor S and wire W through the high resistance winding of sleeve relay 440 to grounded (+) on contact 442. Sleeve relay 440 releases and opens contacts 443 to mark this circuit idle and to open a holding path for switch relay 360. However, it does not release at this time since it still has a completed locking circuit by way of contacts 367, 325 and 253. At contacts 444 the holding circuit via contacts 335 for helping sleeve relay 310 is opened causing it to release. Upon release, relay 310 opens contacts 312 over which a (−) battery marking had been extended to conductor M, and a grounded (+) marking is extended over contacts 223 and 311 to the M conductor, thus giving disconnect supervision to the distant office. Contacts 313 return an idle line termination to conductors T1 and R1, the termination circuit including contacts 255', 313, resistance R403 and capacitor C402.

Responsive to the disconnect supervision extended over the M conductor, equipment in the distant office releases to remove ground from the E conductor thereby releasing pulse relay 340 which in turn opens contacts 342 thereby restoring release delay relay 320. It opens its contacts 325 thereby removing a grounded (+) marking previously extended from contacts 253 to conductor BT and also releasing switch relay 360 which had been holding via contacts 367. Relay 360 closes its contacts 367' and 365' to disconnect conductors T and T1 and conductors R and R1. Grounded (+) is reconnected to all trunks busy conductor at contacts 365 and (−) battery is removed at contacts 362 from conductor BL thereby extinguishing busy lamp L401.

*Sec. 7. Rering*

On occasions it may be necessary for operator 110 (Fig. 4) to rering or recall an operator in the distant office, 131, for example. To use such a rering feature, operator 110 (Fig. 4) actuates her ring key (not shown) thereby applying a resistance battery marking to the tip conductor T thereby operating off-normal relay 420 over a circuit which may be traced from conductor T through contacts 366', the lower winding of retard coil 410, contacts 369 and through the winding of off-normal relay 420 to grounded (+) by way of contacts 336. Relay 420 operates and closes contacts 422 for operating rering relay 330 by way of contacts 373. Responsive thereto, contacts 335 open thereby placing helping sleeve relay 310 under the direct control of off-normal relay 420; that is, the circuit from (−) battery through the upper winding of relay 310 is now completed through operated contacts 424 and 444 to grounded (+). After a brief interval, the operator releases her ringing key thereby removing the resistance battery marking from conductor T, releasing off-normal relay 420 which was held from conductor T over contacts 366', 369 and 425. Off-normal relay 420 opens contacts 424 thereby releasing helping sleeve relay 310 which in turn opens contacts 312 to remove the (−) battery marking by way of resistance lamp L301 and contacts 372 and 312 from the M conductor and aplying a direct grounded (+) marking through contacts 223 and 311 to the M conductor thereby flashing a lamp as a recall signal to the distant operator. This lamp locks in by means of apparatus (not shown) at the distant end and continues to flash until answered there. Upon restoration, off-normal relay 420 also opens contacts 422 for de-energizing rering relay 330 which had been holding via contacts 373; however, this relay does not restore until after a brief interval due to its slow release characteristics, after which time closed contacts 335 reoperate helping sleeve relay 310 via contacts 444. This in turn opens contacts 311 and closes contacts 312 to change the M condutor marking from grounded (+) to (−) battery thereby ending the rering signal to the distant office. Hence it is seen that the rering signal to the distant office is transmitted during the period defined by the release time of relay 330, which is approximately 0.1 seconds.

*Sec. 8. Call from intertoll trunk circuit 132 to operator 110*

When a calling party in toll office 101 places a call, signal equipment 121 extends a grounded (+) marking over the E conductor to seize intertoll trunk circuit 111 and incoming selector 122. This marking is effective for operating pulse relay 340. Responsive thereto, contacts 341 open to remove the idle marking normally extended from intertoll trunk circuit 111 to the all trunks busy conductor. Normally, this indication is extended from ground (+) over contacts 256, 341, 365, 326, 332 and the make busy key. Contacts 342 are closed for operating release delay relay 320 from grounded (+) applied through contacts 256 and 342 to (−) battery by way of the windings of relay 320. Contacts 343 are closed to complete a loop across conductors T2 and R2 for seizing incoming selector 12. This loop may be traced from conductor T2 through contacts 257', 367', the lower winding of retard coil 410, contacts 361', 252', 343, 259 and 363' through the upper winding of retard coil 410, contacts 365' and 254' to conductor R2.

Intertoll trunk circuit 111 is now marked busy to other calls. That is, release delay relay 320 operates closing contacts 325 thereby connecting grounded (+) from contacts 253 to conductor BT for marking intertoll trunk circuit 111 as busy to other equipment. A circuit is also completed from grounded (+) on contact 253 through contacts 325 to sleeve conductor S3 by way of contacts on the make busy key thereby marking intertoll trunk circuit 111 as busy to intertoll selector 123. This ground is also extended over conductor S2 for special marking purposes in subsequent switches. Release delay relay 320 lights busy lamp L401 at contacts 323 thereby marking trunk circuit 111 busy to operators such as 110, for example. This same circuit from (−) battery on contacts 323 feeds through contacts 441 and the low resistance winding of relay 440 to give operator 110 an audible busy signal. Contacts 324 are opened to prevent any possible subsequent operation of sleeve relay 440 thus preventing interference from operator position 110 should she inadvertently apply (−) battery to sleeve conductor S. Helping sleeve relay 310 is connected to conductor HS2 at contacts 328, and the circuit for operating off-normal relay 370 is extended through contacts 322 thereby preparing a circuit for subsequent operation of this relay.

*Sec. 9. Dialing*

Dialing pulses are received in the form of breaks in the ground marking extended over the E conductor from the distant office via signal circuit 121. On each break, pulsing relay 340 is released thereby opening contacts 343 to break the loop connected across conductors T2 and R2. Incoming selector 122 responds to these loop pulses in a conventional manner.

Upon receipt of the first digit pulse break, relay 340 releases and opens the circuit to release delay relay 320 at contacts 342. Pulsing relay 340 also closes a circuit to operate shunt relay 430, the circuit being traced from (−) battery through the winding of shunt relay 430, operated contacts 327, and resting contacts 365, 341 and 256 to grounded (+). Shunt relay 430 operates to break the tip and ring conductors at contacts 435 and 433 thereby improving the pulsing characteristics over conductors T2 and R2. Shunt relay 430 also closes contacts 431 to complete a path for operating off-normal relay 370 from grounded (+) through contacts 431, 361 and 322 to (−) battery by way of the winding of off-normal relay 370. Off-normal relay 370 operates closing contacts 376 and 377 thereby shunting retard coil 410 to provide a direct metallic circuit over which pulse relay 340 repeats each digit pulse. It may now be seen that on receipt of each incoming pulse, relay 340 closes contacts 343 thereby completing the loop from conductor T2 over contacts 257′, 367′, 377, 252′, 343, 259, 363′, 376, 365′ and 254′ to conductor R2. Also, it might be noted that during pulsing, contacts 341 and 342 alternately open and close; however, relays 430 and 320 continue to be held operated due to their slow release characteristics. Upon completion of each train of digit pulses, contacts 341 open long enough for shunt relay 430 to release; however, it reoperates on the next succeeding pulse train.

When incoming selector 122 and its associated switch train have been suitably positioned by dial pulses received over the E conductor, the called party is signaled in any conventional manner following which he responds by removing his handset and a circuit is closed via the HS2 lead and contacts 328 for operating helping sleeve relay 310. This relay operates and opens contacts 311 while closing contacts 312 thereby transferring the M conductor from grounded (+) at contacts 223 to resistance battery at contacts 372 as a signal giving answer supervision to the calling office by way of signal circuit 121. Conversation follows over conductors T1, T2, R1 and R2.

*Sec. 10. Called party disconnects first*

When the called party is first to disconnect, the polarity of conductor HS2 is reversed thereby releasing helping sleeve relay 310 which in turn opens contacts 312 and closes contacts 311 to extend grounded (+) from contacts 223 to the M conductor for giving disconnect supervision to the distant office. The distant office releases responsive to this supervision and signal circuit 121 removes the grounded (+) marking from the E conductor thereby releasing pulse relay 340. Relay 340 restores, opening contacts 343 which previously had completed a holding loop across conductors T2 and R2 by way of retard coil 410. Opening this loop releases the incoming selector and its associated switch train. In releasing, pulse relay 340 also closes contacts 341 and opens a holding circuit at contacts 342 for release delay relay 320; however, it does not restore immediately due to its slow release characteristics. During this brief time interval, a circuit is closed for operating shunt relay 430 from (—) battery through the winding of relay 430, closed contacts 327, 365, 341 and 256 to grounded (+). Release delay relay 320 then opens contacts 327 thereby de-energizing shunt relay 430 which, in turn, remains operated for another brief interval marked by its slow release characteristics. During this last mentioned brief interval, a circuit is completed from grounded (+) through contacts 431, 361, 321 and 251 to the peg count (in) conductor where a suitable call record is made. A peg count meter is a device that is operated on each call to record the number of calls directed through this trunk circuit.

Release delay relay 320 also returns the all trunks busy conductor to an idle trunk marking when contacts 326 are closed. Contacts 323 open to remove the busy marking from conductor BL thereby extinguishing busy lamp L401. A grounded (+) marking is returned to conductor S at contacts 253 and 324 so that intertoll trunk circuit 111 may test idle at the operator position.

*Sec. 11. Calling party disconnects first*

When the calling party is the first to disconnect, equipment in the distant office removes a ground marking from the E conductor via signal circuit 121 thereby releasing pulse relay 340 following which the circuit is released in the manner described in the next preceding section.

Following the release of relay 340, contacts 343 open to break the loop formerly connected through retard coil 410 and across conductors T2 and R2 to incoming selector 122 and its associated train which release. At this time conductor HS2 is opened causing the release of helping sleeve relay 310. Contacts 312 open and 311 close to return a disconnect supervision to the distant office over conductor M.

*Sec. 12. Call from intertoll selector 123 to intertoll trunk circuit 132*

Intertoll selector 123 (Fig. 2) may seize conductors T3, R3, S3 and HS3 and close a loop across conductors T3 and R3 for operating calling bridge relay 220, the circuit being completed by way of retard coil 240. Calling bridge relay 220 operates and closes contacts 222 thereby operating release delay relay 210 over an obvious circuit. Calling bridge relay 220 also opens contacts 223 to remove the grounded (+) marking normally extended over the M conductor and closes contacts 224 thereby applying (—) battery through resistance lamp L301, contacts 372, 224 and 311 to the M conductor. This marking is a seizure signal to the distant office.

Intertoll trunk circuit 111 is now marked busy to other calls. Release delay relay 210 operates and connects grounded (+) to conductor BT by way of contacts 213 thereby marking intertoll trunk circuit 111 as busy to other equipment. At contacts 213, a circuit is also closed for marking conductors S3 and S2 to guard the intertoll trunk circuit 111 against seizure by other equipment; also, the marking on conductor S3 holds intertoll selector 123 operated. Grounded (+) is connected at contacts 212 to operate switch relay 250 over an obvious circuit. It operates and connects conductors T3 and R3 with conductors T1 and R1, respectively, at contacts 256′ and 253′. Contacts 255′ are opened to remove the idle line termination comprising capacitor C402 and resistor R403 from across conductors T1 and R1. Contacts 251′ connect conductor HS3 with contacts 343. This connection prepares for supervision; however, there is no effect at this time since contacts 343 are open. Contacts 256 remove the grounded (+) marking from the all trunks busy conductor, this marking was formerly extended over contacts 341, 365, 326, 332 and the make busy key to the all trunks busy conductor. Contacts 253 are opened to prevent a possible operation of sleeve relay 440 in case operator 110 inadvertently connects (—) battery with conductor S. Contacts 251 are opened to disconnect the peg count (in) conductor.

*Sec. 13. Dialing*

The circuit is now prepared for dialing-out from intertoll selector 123. The switch directing signals which are received by intertoll trunk circuit 111 consist of alternate make and break periods during which the loop across conductors T3 and R3 is sequentially opened and closed. Calling bridge relay 220 releases during each break period and reoperated during each make period.

When the first digit pulse is received, calling bridge relay 220 opens contacts 223 thereby removing grounded (+) from the M conductor extending to signal circuit 121 via contacts 311 and closes contacts 224 thereby connecting (—) battery to the M conductor by way of resistance lamp L301, contacts 372, 224 and 311. This alternate switching of the M conductor between grounded (+) and resistance (—) battery occurs during each time that a digit pulse is received; hence, relay 220 is operative to repeat digit pulses over the M conductor.

Upon receipt of the first digit pulse, calling bridge relay 220 also opens contacts 222 thereby de-energizing release delay relay 210. At contacts 221, a circuit is closed which extends from grounded (+) through contacts 214 to (—) battery through the winding of shunt relay 230 which operates. As long as dial pulses are received, neither relay 210 nor relay 230 release due to their slow release characteristics. When shunt relay 230 operates, it closed contacts 232 thereby operating shunt relay 430 which in turn opens contacts 435 and 433 thereby removing the repeat coil in future equipment E406 from across conductors T1 and R1, thus improving the impulse repeating characteristics of calling bridge relay 220. At contacts 434, a circuit is closed to provide idle line termination for conductors T1 and R1, thus preventing an unbalanced condition. At contacts 233, a spark protection circuit SP is connected across calling bridge relay 220, and at contacts 234 and 235 a direct metallic path is completed from conductors T3 and R3 to calling bridge relay 220 thereby preventing possible pulse distortions which might result from the inductance of retard coil 240.

Upon completion of the last pulse in each digit pulse train, contacts 221 remain open long enough to release shunt relay 230 while release delay relay 210 is held at contacts 222. The circuit to shunt relay 430 is opened at contacts 232 so that equipment E406 may again be connected to conductors T3 and R3 respectively. At contacts 234 and 235, the circuit for calling bridge relay 220 is again connected to conductors T3 and R3 by way of retard coil 240.

When the called party answers, a ground marking is extended over conductor E from signal circuit 121 for operating pulse relay 340 which in turn closes contacts 343 thereby extending answer supervision to intertoll selector 123. This supervision is from (—) battery through a resistance connected with closed contacts 258 through contacts 343 and 251′ to conductor HS3. Conversation follows over conductors T1, R1, T3 and R3.

*Sec. 14. Called party releases first*

When the called party is the first to release, the ground marking is removed from the E conductor thereby releasing pulse relay 340 which in turn opens contacts 343 to remove the resistance (—) battery connected through closed contacts 258, 343 and 251′ to conductor HS3. Upon receipt of this supervision, the operator who has control over intertoll selector 123 causes the loop across conductros T3 and R3 to be opened and calling bridge relay 220 is released. When it restores, contacts 222 open and contacts 221 close. Relay 210 continues to be held for a brief interval determined by its slow release characteristics. Shunt relay 230 operated during this brief interval via contacts 221 and 214. Following this, relay 210 releases responsive to open contacts 222 and in turn shunt relay 230 is held during another brief interval determined by its slow release characteristics, following which it is released. During the period between release of relays 210 and 230, a circuit is completed for marking the peg count (thru) conductor, this circuit being from grounded (+) through contacts 211 and 231.

Calling bridge relay 220 is effective to signal release to the distant office via the M conductor. That is, contacts 224 open and contacts 223 close to switch the M conductor from resistance (—) battery to grounded (+). Responsive thereto, equipment in the distant office releases.

It should be noted that during the release time, intertoll trunk circuit 111 is not left unguarded since shunt relay 230 closes contacts 232 thereby operating shunt relay 430 which in turn closes contacts 432 for maintaining a busy marking on conductor BT and on conductors S3 and S2. Also, contacts 432 are effective for holding switch relay 250 operated over its locking contact 254. When shunt relay 230 releases, contacts 232 open and after a brief interval shunt relay 430 released to open contacts 432 as an indication that trunk circuit 111 is again idle. Also following the opening of contacts 432, switch relay 250 releases to return conductors T1 and R1 to their normal connection with conductors T2 and R2. Idle line termination is returned to conductors T1 and R1 when contacts 255′ close. At contacts 252′ and 259, retard coil 410 is returned to its normal connection across conductors T1 and R1. Contacts 252 open to extinguish busy lamp L401, and contacts 256 close to return an idle marking to the all trunks busy conductor.

*Sec. 15. Calling party disconnects first*

When the calling party is the first to disconnect, conductors T3 and R3 are opened to release calling bridge relay 220. This relay restores and switches the M conductor from resistance (—) battery to grounded (+) at contacts 223 and 224. Release delay relay 210 restores and shunt relay 230 operates and restores as explained in the immediately preceding section. Shunt relay 430 operates to hold a busy marking on intertoll circuit 111 during the release period. Responsive to the reconnection of grounded (+) to the M conductor by way of contacts 311 and 223, equipment at the distant end is released and grounded (+) is removed from the E conductor, following which pulsing relay 340 releases to remove answer supervision formerly extended from (—) battery through a resistance on contacts 258 to conductor HS3.

*Sec. 16. Rering*

Since the call extended through intertoll selector 123 is from an operator position in distance office 124, it may be that she will wish to recall an operator at the other end, i. e., connected to conductors T1 and R1. In this case, the recalling operator operates her ringing key thereby opening and closing conductors T3 and R3 which in turn releases calling bridge relay 220. Responsive thereto, the M conductor is switched from (—) battery through resistance lamp L301, contacts 372, 224 and 311 to grounded (+) on contacts 223 thereby flashing a recall signal to the distant operator. When the ringing key is returned to normal, relay 220 reoperates and the M conductor is returned to its resistance battery marking; however, equipment which is not shown locks in the flashing recall signal until the operator answers.

*Sec. 17. Adapter circuit 112*

The preceding portion of the specification has described possible calls which may be extended through intertoll trunk circuit 111 since this circuit functions the same without regard as to whether the call is by way of adapter 112 or direct to conventional equipment. Now, there will follow a description of how adapter 112 operates, with reference to suitable portions of the preceding specification for the operation of connecting circuits.

Figure 5:
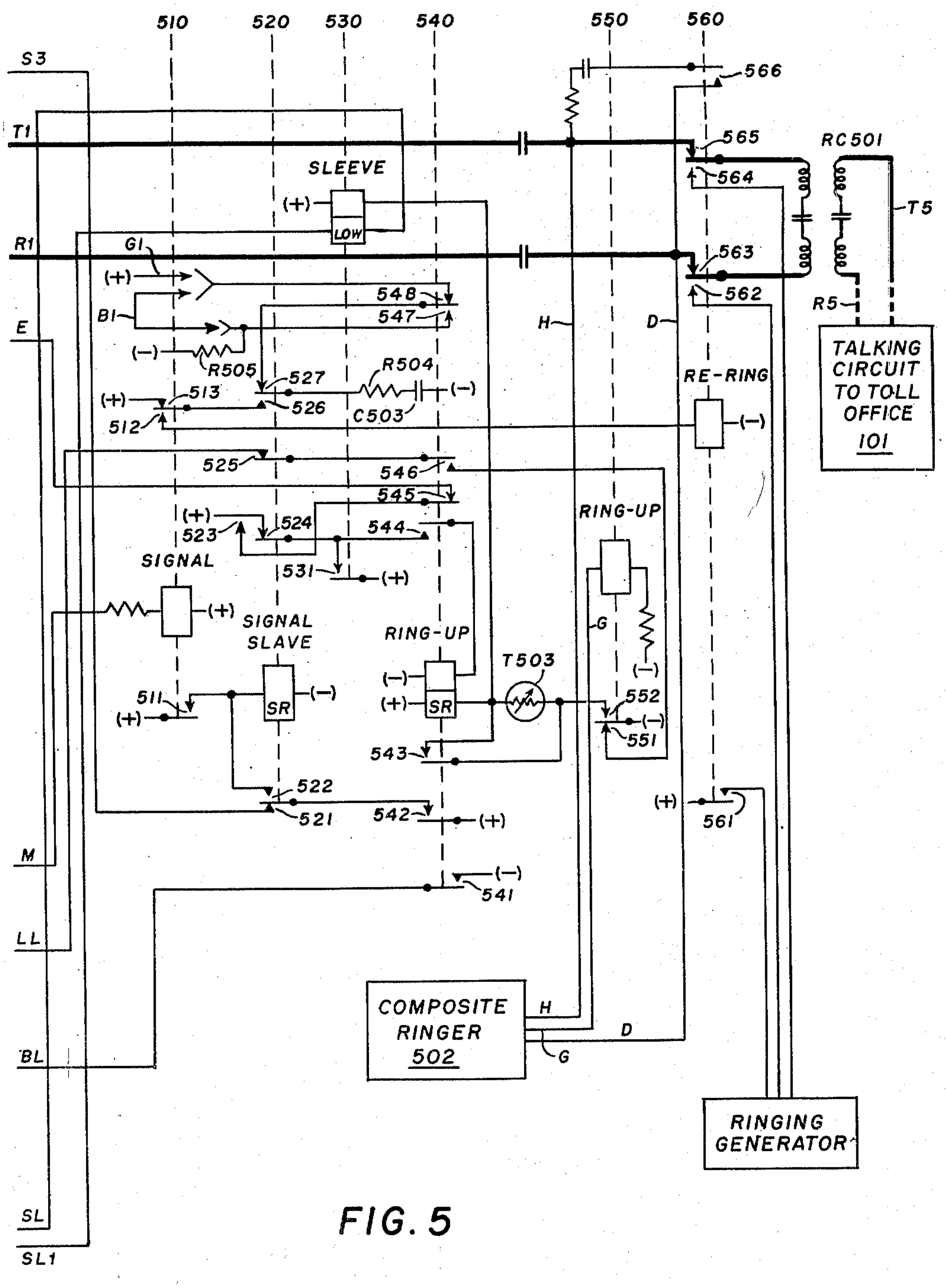
Fig. 5 shows adapter 112.

The adapter circuit shown in Fig. 5 is arranged for providing temporary service before other equipment is installed. For example, toll office 101 may be equipped for manual service; whereas, intertoll office 100 may be provided with intertoll dialing facilities using polar-duplex signaling. Under these conditions it is necessary to provide some means wherein the equipment of toll office 100 may be adapted to work into toll office 101. Adapter 112 provides such a function, this being considered expendable equipment which will be removed and discarded once toll office 101 is equipped. The future connection may be made by removing all equipment shown in Fig. 5. The talking conductors T1 and R1 are connected through contacts 113 to future equipment E406 instead of to adapter 112. The W wire (Fig. 4) is used when the future equipment is connected into the trunk circuit and conductors SL and SL–1 are used with adapter 112.

*Sec. 18. Adapter operation on incoming call via repeat coil RC501*

Adapter circuit 112 is seized by the application of ringing current to the two-way line conductors T5 and R5 from distant toll office 101. Responsive thereto, ring-up relay 550 operates. That is, ringing current is extended from conductor T5, through coil RC501, and contacts 565 to conductor H and composite ringer 502, and from conductor R5, through coil RC501 and contacts 563 to conductor D and composite ringer 502. Responsive thereto, composite ringer 502 applies a grounded (+) marking over conductor G and through the winding of ring-up relay 550 to (—) battery. It operates and closes its contacts 552 thereby completing a circuit through thermistor T503 and the lower winding of ring-up relay 540 to grounded (+). A parallel circuit is also completed from thermistor T503 to grounded (+) through the upper winding of sleeve relay 530. Both sleeve relay 530 and ring-up relay 540 operate after a brief interval of time determined by the characteristics of thermistor T503. This time delay is to prevent transients from operating the signal devices. At contacts 543, a circuit is completed for shunting thermistor T503. Ring-up relay 540 locks at contacts 544 and 531 and 524 in parallel. At contacts 542, a circuit is completed for extending a grounded (+) marking over conductors S3 and S2 to mark intertoll trunk circuit 111 busy to other equipment. At contacts 541, a circuit is completed for lighting and holding the busy lamp L401 in a lit condition thereby marking intertoll trunk circuit 111 busy to other operators. Contacts 546 prepare a path over conductor LL to incoming lamp L402; however, this path is ineffective at this time since ring-up relay 550 is operated and therefore contacts 551 are open. If the G1 wiring is provided, contacts 547 are closed for discharging capacitor C503. These elements are effective on outgoing calls and will be explained later with the description of such a call in section 20.

When ringing current is removed from conductors T5 and R5, composite ringer 502 removes the grounded (+) marking from conductor G thereby releasing ring-up relay 550. Ring-up relay 540 continues to hold after contacts 552 are opened since there is a complete locking path via contacts 524 and 544. Responsive to the release of relay 550 and the continued operation of relay 540, (−) battery is applied to conductor LL thereby lighting incoming lamp L402 over a circuit including contacts 551, 546 and 525. Contacts 552 open releasing sleeve relay 530 which had been holding over the circuit including contacts 552 and 543.

The operator at switchboard 110 (Fig. 4) observes the lighted condition of lamp L402 and responds by making a suitable plug and jack connection. An answer (−) battery is connected to the M conductor as described above in section 1 thereby closing a circuit for signal relay 510, the circuit extending from grounded (+) through the winding of signal relay 510, the M conductor, contacts 312 and 372 to (−) battery via resistance lamp L301. Relay 510 closes contacts 511, thus completing an obvious circuit for operating signal slave relay 520. Relay 520 opens contacts 522 thereby removing the grounded (+) marking formerly extended from contacts 542 to conductors S3 and S2. This marking is no longer needed to hold intertoll trunk circuit 111 busy since such a marking is now furnished from contacts 443 which are held closed under the influence of the operator's plug and jack arrangement. Ring-up relay 540 is slow to release; thus, it will continue to be held briefly after its locking circuit is opened at contacts 524. Once the operator answers, incoming lamp L402 is no longer required to be lighted; therefore, contacts 525 and 546 are opened to remove the marking formerly extended to conductor LL thereby extinguishing incoming lamp L402. Capacitor C503 and resistance R504 are connected in a circuit leading to rering relay 560, the circuit being traced from (−) battery through capacitor C503, resistor R504, contacts 526 and 512, through the winding of relay 560 to (−) battery. Nothing happens at this time since capacitor C503 is discharged due to the circuit previously extended through contacts 527 and 547 to (−) battery via resistance R505. Responsive to the restoration of relay 540, the shunt across thermistor T503 is opened. The circuit to signal relay 520 is opened at contacts 542; however, it does not release at this time since it is held at contacts 511 by relay 510 which in turn is held over the M conductor. Contacts 541 remove a (−) battery marking from conductor BL, while contacts 523 and 545 cooperate to return a grounded (+) marking over the E conductor. This marking simulates the calling signal as described above in section 8.

*Sec. 19. Release*

When the calling party disconnects, ringing current is momentarily applied from toll office 101 across conductors T5 and R5 which reoperates ring-up relay 550; the circuit being traced from conductor T5 through repeat coil RC501, contacts 565 and conductor H to composite ringer 502, and from conductor R5 through repeat coil RC501, contacts 563 and conductor D to composite ringer 502. Responsive thereto, a grounded (+) marking is extended over conductor G to operate ring-up relay 550. Contacts 552 are now operated to energize ring-up relay 540 and sleeve relay 530 in parallel after an interval determined by the characteristics of thermistor T503. Sleeve relay 530 closes contacts 531 thus preparing a holding circuit for ring-up relay 540. It operates and closes contacts 541 to hold busy lamp L401 which previously had been holding from trunk circuit 111. Ground is removed from the E conductor when contacts 545 open. When ringing current is removed from conductors T5 and R5, composite ringer 502 removes grounded (+) from conductor G thereby releasing ring-up relay 550. Relay 550 restores and opens contacts 552 thereby de-energizing the upper winding of sleeve relay 530. Responsive to removal of grounded (+) from the E conductor, pulse relay 340 releases and contacts 341 comprise means for connecting grounded (+) from contacts 256 through contacts 341, 366, the upper winding of relay 440, control conductors S, SL-1, the lower winding of relay 530, control conductor SL and the jack and plug to operator 110 (Fig. 4) where marginal supervisory lamp L403 is lit. Sleeve relay 530 is held operated via this circuit. After the operator notices the lighted supervisory lamp, she throws her talk key to challenge the call for determining whether the connection should be taken down. Her talk key is arranged to insert a resistance R405 in lieu of lamp L403. Relay 530 cannot remain operated by its lower winding only when resistance R405 is in the circuit; therefore, it releases to open contacts 531—thus releasing ring-up relay 540 which in turn closes contacts 545 to return the grounded (+) marking to conductor E.

When the operator unplugs, the circuit is released as described above in section11.

*Sec. 20. Adapter operation on outgoing calls*

Adapter 112 may be seized to extend any one of a number of different outgoing calls. For example, the call may be either from operator position 110 or from intertoll selector 123, for example, see Sections 1–7 and 12–16, above. In either event, a (−) battery marking is applied to the M conductor thereby operating signal relay 510 which closes contacts 511 for operating signal slave relay 520. When it operates, a circuit is completed from grounded (+) on contacts 523 through contacts 545 to the E conductor as a preparation to answering supervision. The LL conductor is opened at contacts 525 thereby preventing the signal of an incoming call at operator position 110.

Means is provided to transmit a timed seizure signal comprising two seconds of ringing current applied over conductors T5 and R5 to distant toll office 101 where ringdown trunk circuit 130 utilizes such signal to call operator 131. Adapter circuit 112 provides an option whereby this ring-down signal may be transmitted either automatically or manually, as desired. If automatic ringing is to be applied, conductor G1 (Fig. 5) is supplied and conductor B1 (Fig. 5) is removed. In this case, when the adapter circuit is in its normal condition, a path for charging capacitor C503 may be traced from grounded (+) over conductor G1, contacts 548 and 527, through resistor R504 and capacitor C503 to (−) battery. Capacitor C503 charges. Therefore, when signal relays 510 and 520 operate, a path is completed through contacts 526 and 512 for operating rering relay 560 responsive to the discharge current from capacitor C503. This relay closes contacts 561 which start the ringing generator. At contacts 562 and 564, the output of the ringing generator is connected to repeat coil RC501. In about two seconds when capacitor C503 is completely discharged, rering relay 560 releases opening contacts 562 and 564 thereby disconnecting the ringing generator from connection with repeat coil RC501. This pulse of ringing current is a seizure signal to distant office 101.

If manual ring-down control is to be used, conductor B1 (Fig. 5) is supplied and conductor G1 (Fig. 5) is omitted. Under these conditions rering relay 560 does not operate at this time since the normal condition capacitor C503 is discharged over the circuit extending from (−) battery through capacitor C503, resistor R504, contacts 527 and 548 to (−) battery by way of conductor B1 and resistance R505. Hence, there is no charge and therefore no discharging current when contacts 526 and 512 are closed.

Some operators do not transmit ringing current directly from their position. Instead, they transmit a particular signal which is used by other equipment for controlling the application of ringing current for a particular time interval. For example, in the case of operator 110 (Fig. 4) this signal is in the form of a (−) battery applied to the tip conductor T for operating off-normal relay 420 over a path extending from switchboard 110 (Fig. 4) through contacts 366′ the lower winding of retard coil 410, contacts 369, the winding of off-normal relay 420, and contacts 336 to grounded (+). Off-normal relay 420 operates and closes contacts 422 to operate rering relay 330 over a path including contacts 373. Contacts 335 open so that helping sleeve relay 310 is held via contacts 424 and 444 only. After a while, the operator releases her ringing key to remove the (−) battery marking from conductor T, thereby releasing off-normal relay 420 which drops to open contacts 424 and 422. Helping sleeve relay 310 drops at once; however, rering relay 330 continues to be held for an interval marked by its slow release characteristics. During this interval, helping sleeve relay 310 opens contacts 312 and closes contacts 311 to switch the M conductor from (−) battery via contacts 372 and 312 to grounded (+) via contacts 223 and 311. After its slow release, rering relay 330 closes contacts 335 to reoperate helping sleeve relay 310 from grounded (+) on contacts 444 responsive to which the M conductor is returned to (−) battery. Signal relay 510 releases and reoperates when the M conductor is switched from (−) battery to grounded (+) and back to (−) battery. Contacts 511 open; however the interval is not long enough to cause the release of signal slave relay 520; therefore, it continues to be held due to its slow release characteristics.

Means is provided for transmitting a timed signal when signal relay 510 releases, a path is completed for charging capacitor C503 from grounded (+) through contacts 513 and 526, resistor R504 and capacitor C503 to (−) battery. When signal relay 510 reoperates, capacitor C503 discharges for approximately two seconds over the path through resistor R504, contacts 526 and 512 and the winding of rering relay 560 to (−) battery. It operates during the interval marked by the discharging current. Responsive thereto, contacts 562 and 564 close to transmit a two second timed pulse of ringing current through repeat coil RC501 to conductors T5 and R5.

If the call was from intertoll selector 123, the distant operator merely breaks the loop across conductors T3 and R3 whereupon calling bridge relay 220 releases and transfers the M conductor from (−) battery on contacts 224 to grounded (+) on contacts 223. Following the loop break, relay 220 reoperates and the M conductor returns to (−) battery. The adapter functions as described in the immediately preceding paragraph.

Responsive to the two second period of ringing current transmitted over conductors T5 and R5, suitable equipment in toll office 101 is operated to signal switchboard 131. The operator at position 110 or the operator having access by way of intertoll selector 123, as the case may be, informs operator 131 as to the destination of the call, whereupon she proceeds to use conventional equipment for completing the call so that conversation may follow.

*Sec. 21. Release*

When the party at toll office 101 disconnects, ringing current is momentarily applied to conductors T5 and R5, repeat coil RC501, and conductors H and D to composite ringer 502. Grounded (+) is applied to conductor G and ring-up relay 550 operates, closing a circuit through contacts 552 and thermistor T503 for operating ring-up relay 540 after a brief interval determined by the characteristics of thermistor T503. Ring-up relay 540 operates and opens contacts 545 thereby removing the grounded (+) marking from conductor E thus causing the release of pulse relay 340. Responsive thereto, contacts 341 close to complete a circuit from contacts 256 through 366 to sleeve conductor S by way of the low resistance winding of sleeve relay 440. Marginal lamp L403 lights at position 110 (Fig. 4) thus serving to extend disconnect supervision to the operator. This circuit includes conductors SL–1, the lower winding of relay 530 and conductor SL, the W wiring being omitted at this time. If the call was from intertoll selector 123, contacts 343 open to extend disconnect supervision through intertoll selector 123, i. e., a circuit is broken which formerly extended from (−) battery through contacts 258, 343 and 251′ to conductor HS3.

When ringing current ceases, the various relays in adapter 112 release and grounded (+) is returned to the E conductor by way of contacts 523 and 545. Either operator, as the case may be, notes her flashing lamp and proceeds to operate her talk key as explained in Section 19 above. Following this, she removes her plug and jack connection. In either event, the (−) battery marking is removed from the M conductor when circuit 111 releases causing the restoration of signal relay 510 and signal slave relay 520. At this time the grounded (+) marking is removed from the E conductor permanently; intertoll trunk circuit 111 restores; and, the equipment is in condition for the next call.

*Sec. 22. Call from dial to manual trunk circuit 150 to dial tributary trunk circuit 115*

The dial tributary office may initiate a call by transferring conductor CX1 (Fig. 6) from ground to battery as a seizure signal. Signal relay 850 operates in response thereto over a path which may be traced from conductor CX1 through contacts 611, 811 and the winding of signal relay 850 to grounded (+). This in turn closes contacts 851 for connecting grounded (+) from contacts 631 to the interrupter start lead. This circuit is effective to start the interrupter if it is not then running. At contacts 853, a circuit is completed from the ring-back tone generator to inform the calling party as to the satisfactory progress of his call, the circuit being further completed to conductor T8 via contacts 633, 613′ and 847. Contacts 855 are closed to light incoming lamp L602 by way of contacts 635 thereby notifying the operator that there is a call to be answered.

Various circuits are now closed to mark dial tributary trunk busy, thereby guarding against seizure by another call. For example, contacts 852 connect grounded (+) through the winding of sleeve slave relay 640 to (−) battery in parallel therewith and to conductor TS for marking dial tributary trunk circuit 115 as busy to test equipment. Sleeve slave relay 640 operates and applies a grounded (+) marking to sleeve conductor S6, the path being traced from grounded (+) on contact 852 through contacts 813 and 644 to sleeve conductor S6 by way of the make busy key. Contacts 646 close to light busy lamp L601 and a similar lamp at each operator position thus guarding dial tributary trunk 115 against seizure from another operator position. At contacts 642, a circuit is opened which extended from grounded (+) on the make busy key to the all trunks busy conductor. At contacts 643, a locking circuit is prepared for sleeve slave relay 630.

The operator at position 110 (Fig. 6) notices that her incoming lamp L602 is glowing as an indication that there is an unanswered incoming call. She responds by making a suitable plug and jack connection at J602 thereby applying a (−) battery marking to sleeve conductor S7 which operates sleeve relay 620 over its high resistance winding to grounded (+) on contacts 831. Sleeve relay 620 operates and closes contacts 623 to complete an obvious circuit for operating sleeve slave relay 630 which in turn locks over its contacts 632 and through contacts 643 to grounded (+) on the make busy key. Sleeve relay 620 also closes an obvious circuit at contacts 624 for operating switch relay 610. Sleeve slave relay 630 removes ring back tone at contacts 633. Since the interrupter is no longer necessary, contacts 631 remove the grounded (+) marking from the interrupter start lead. Incoming lamp L602 is extinguished when contact 635 opens.

The operator is connected with dial tributary trunk circuit 115; therefore it is necessary to switch the talking conductors through to the distant exchange. For this purpose, switch relay 610 operates over an obvious circuit from contacts 624 for switching conductors T8 and R8 from their normal connections with conductors T6 and R6 through contacts 611' and 613' to connection with conductors T7 and R7 at contacts 612' and 619. The original operating circuit for signal relay 850 is opened at contacts 611. At contacts 614, an alternate holding circuit is completed for sleeve slave relay 640 since the release of signal relay 850 opens contacts 852 which originally held sleeve slave relay 640. At contacts 612, a circuit is completed through the windings of supervisory relay 750; however, this relay does not operate at this time since the distant office maintains a (−) battery marking on conductor CX until the calling party disconnects. The circuit for supervisory relay 750 extends from contacts 612 through contacts 724 and the upper winding of supervisory relay 750 to (−) battery. The talking circuit is now established from the calling party over conductors T8, R8, T7 and R7 to operator 110 (Fig. 6); therefore, conversation may follow.

*Sec. 23. Calling party disconnects first*

If the calling party is the first to disconnect, a circuit in the distant office places a grounded (+) marking on conductor CX1 thereby completing a path to operate supervisory relay 750 via contacts 612, 724 and the upper winding of relay 750 to (−) battery. Supervisory relay 750 operates and closes contacts 753 to complete a circuit from grounded (+) on contact 838 through the low resistance winding of sleeve relay 620 thereby lighting a marginal supervisory lamp (not shown) at operator position 110 (Fig. 6). This lamp corresponds to lamp L403 which is shown in Fig. 4. She observes this supervisory lamp following which she proceeds to disconnect the plug from jack J602 thereby releasing sleeve relay 620. Responsive thereto, contacts 624 open, thus returning switch relay 610 to normal. At contacts 611, a circuit is completed for transferring conductor CX1 from (−) battery by way of supervisory relay 750 and contacts 724 to grounded (+) by way of contacts 611, 811 and the winding of signal relay 850. Contacts 614 open to release sleeve slave relay 640 which in turn opens contacts 646 to extinguish busy lamp L601 thereby marking the circuit idle to the operator positions. Contacts 644 open and sleeve conductor S6 is returned to an absence of ground marking which is indicative of the idle condition of dial tributary trunk circuit 115 to the selector switches, such as 125, for example. Contacts 614 also remove the busy marking from test sleeve TS.

The supervisory relay 750 released when contact 612 opens and relay 630 releases when contacts 643 open.

It might be noted that switch relay 610 is slow to release; therefore, there is a brief interval following the release of sleeve relay 620 before switch relay 610 drops completely. During this interval, a circuit is completed from grounded (+) on contacts 622 through contacts 613 and 641 to the peg count meter where a suitable record of the call is made. The "All trunks busy" conductor is reconnected to ground when sleeve slave relay 640 releases. That is, it closes contacts 642 to reconnect the grounded (+) on the make busy key to the all trunks busy conductor.

*Sec. 24. Operator disconnects first*

If the operator is the first to disconnect, she merely disconnects a plug from jack J602 thereby releasing sleeve relay 620. Contacts 624 open to release switch relay 610 and contacts 622 complete a circuit to the peg count meter as explained above in Section 23. Switch relay 610 restores and opens a circuit at contacts 614 to sleeve slave relay 640. The circuit releases as explained above in Section 23, except that this time supervisory relay 750 will not have operated there having been no disconnect supervision over conductor CX1 as yet.

When the calling party disconnects, the circuit via conductor CX1 is returned to a grounded (+) marking to release signal relay 850 and in turn open contacts 852 which have been holding sleeve slave relay 640 following the opening of contacts 614. When sleeve slave relay 640 releases, it opens contacts 643 to release sleeve slave relay 630 and closes contacts 642 to return a grounded (+) marking to the all trunks busy conductor. The circuit is ready for the next call.

*Sec. 25. Recall*

If during the progress of the call the calling subscriber should wish to attract the attention of the operator at position 110 (Fig. 6), he flashes his hookswitch. This causes the application of grounded (+) pulses to conductor CX1. Since switch relay 610 is operated at this time, supervisory relay 750 follows these hookswitch pulses over the circuit including conductor CX1, contacts 612 and 724 to (−) battery through the winding of supervisory relay 750. As supervisory relay 750 follows each of these pulses, contacts 753 are alternately opened and closed to extend grounded (+) from contact 838 through the low resistance winding of sleeve relay 620 thereby flashing a marginal supervisory lamp (not shown) at the operator position.

*Sec. 26. Outgoing call from operator position 110 to tributary office 103*

The operator at position 110 (Fig. 6) initiates a call by making a suitable plug and jack connection at jack J602 thereby operating sleeve relay 620 over the path from (−) battery applied to the sleeve of jack J602 through the high resistance windings of sleeve relay 620 to grounded (+) on contact 831. Sleeve relay 620 operates and closes an obvious circuit at contact 624 for operating switch relay 610. A circuit is closed at contact 623 for operating sleeve slave relay 630. Contacts 621 close to lock sleeve relay 620 operated until the plug is disconnected from jack J602. Sleeve slave relay 630 operates and closes contacts 632 to prepare a holding path for itself. The circuit for ring back tone is opened at contacts 633 and a circuit is opened at contacts 635 to prevent the lighting of incoming lamp L602 since these features are not required on outgoing calls. Switch relay 610 operates and opens contacts 611' and 613' to break the normal connection between conductors T8, R8 and the selector banks of switch 125. Contacts 619 and 612' are closed to interconnect conductors T7, R7, T8 and R8 for completing an outgoing talking circuit from operator position 110 to the dial tributary office 103 via connection 116.

Dial tributary trunk circuit 115 is now marked busy to other equipment. That is, relay 640 operates from grounded (+) on contact 614 to connect (−) battery to conductor BL at contacts 646 thereby marking dial tributary trunk circuit 115 as busy to other operator positions, each of which is furnished with a lamp corresponding to busy lamp L601 which is now lit. Contacts 642 are opened to remove the grounded (+) marking normally applied to the all trunks busy conductor when trunk circuit 115 is idle. At contacts 643, a holding circuit is completed for locking sleeve slave relay 630. Contacts 644 close to extend a busy marking to conductor S6 thereby guarding against the possibility of selector seizing dial tributary trunk 115. This busy marking is extended from grounded (+) on closed contacts 614 through contacts 813 and 644 and contacts on the make busy key to conductor S6.

A circuit is now completed to seize equipment at dial tributary office 103. Conductor CX1 is transferred from its normal connection through contacts 611 and 811 to grounded (+) through the winding of relay 850, to a (−) battery marking by way of contacts 612, 724 and the winding of supervisory relay 750. This transfer of potential connected to conductor CX1 seizes equipment in the distant office.

The CX1 conductor is used to conduct digit pulses to dial tributary office 103; therefore trunk circuit 115 is prepared for dialing. That is, contacts 614 are closed to mark test sleeve busy and to operate sleeve slave relay 640. Contacts 617 are closed preparing a path to off-normal relay 710, while contacts 615 are closed preparing a path through contacts 712 to retard coil 730. It might be noted that off-normal relay 710 is now connected with tip conductor T7 which extends to the operator's position by way of the upper winding of repeat coil RC603 and jack J602, while retard coil 730 is connected by way of contacts 712, 615 and the lower winding of repeat coil RC603 to ring conductor R7 and jack J602 to operator 110 (Fig. 6).

As soon as equipment in dial tributary office 103 is ready to receive dial pulses, a ground marking is returned over conductor CX1. Supervisory relay 750 operates under the influence of this marking which is further extending by way of contacts 612 and 724. When it operates, contacts 753 are closed thereby extending a grounded (+) marking from contacts 838 through contacts 753 and the low resistance winding of sleeve relay 620 to conductor S7. This lights a marginal lamp (not shown) at operator position 110 (Fig. 6) thereby extending supervision which indicates that dialing may follow. Supervisory relay 750 also opens contacts 755 and closes contacts 754 thereby switching conductor HS6 from (−) battery to grounded (+); this switching has no effect at this time.

*Sec. 27. Dialing*

The operator observes the lighted condition of her marginal supervisory lamp and prepares to dial. Her circuits are arranged such that on dialing battery is applied to conductor T7 thereby operating off-normal relay 710 by way of contacts 612', the upper windings of repeat coil RC603, and contacts 617 to grounded (+) by way of the winding of relay 710. Simultaneously therewith, a grounded (+) marking is applied to conductor R7 through contacts 619, the lower winding of repeat coil RC603, contacts 615 and 712 to retard coil 730. Off-normal relay 710 operates closing contacts 711 and opening contacts 712 thereby connecting pulsing relay 740 to conductor R7 over the path previously traced to retard coil 730. Pulsing relay 740 operates and closes contacts 742 thereby energizing off-normal relay 720 in parallel with off-normal relay 710. Relay 720 closes contacts 725 thereby locking to the tip conductor T7. Pulsing relay 740 closes contacts 741 in preparation for repeating digit pulses. Contacts 744 open the circuit to shunt relay 840, while contacts 743 close to prepare a circuit to test jack J604. Off-normal relay 720 operates and completes the path to test jack J604 at contacts 722 and 726. At contacts 724 and 723, a bridge across contacts 741 is opened so that the continued application of (−) battery through the winding of supervisory relay 750, and contacts 723 and 612 to conductor CX1 is solely dependent upon pulsing contacts 741.

The operator may now dial to set switching equipment in dial tributary office 103. Each digit pulse train takes the form of a series of make and break grounded (+) pulses applied to conductor R7 by operator 110 (Fig. 6). Pulsing relay 740 follows each dial pulse by opening and closing contacts 741 to repeat the pulses over conductor CX1 to the distant office. The first time that pulsing relay 740 falls back, contacts 744 are closed to complete a circuit from grounded (+) on contacts 726 through the winding of shunt relay 840 to (−) battery. It operates and opens contacts 845 and 847 thereby breaking the talking path through dial tributary trunk 115 and closes contacts 846 and 844 thereby connecting conductors T7 and R7 to off-normal relays 710 and 720 and to pulsing relay 740 on a direct metallic basis thereby bypassing the inductive effect of repeat coil RC603 which otherwise might cause pulse distortion. Pulsing relay 740 is now operated over the path from (−) battery through the winding of relay 740, contacts 711, 615, 844, conductor R8, contacts 619 and conductor R7, while off-normal relays 710 and 720 are held from grounded (+) through their windings, contacts 617, 846, conductor T8, contacts 612' and conductor T7. Following each of the digit pulses, relay 740 is reoperated; however, shunt relay 840 does not release due to its slow release characteristics. Also, following each pulse, contacts 741 break the energizing circuit to supervisory relay 750; however, it too is slow to release due to its shunted lower winding and so it too remains operated during pulsing. Furthermore, after the shunt relay 840 operates, it closes contacts 843 thereby extending a circuit through contacts 752 for holding supervisory relay 750 operated.

Following the receipt of the last digit pulse in each pulse train, relay 740 remains operated holding contacts 744 open long enough to release shunt relay 840 which restores and opens contacts 844 and 846 thereby removing the direct metallic connection to pulsing relay 740 and off-normal relays 710 and 720. At contacts 845 and 847, the talking path is re-established from operator position 110 to office 103. Following the transmission of the last complete train of digit pulses, operator 110 removes (−) battery from conductor T7 and grounded (+) from conductor R8 thereby releasing off-normal relays 710 and 720 and pulsing relay 740. Upon restoration, off-normal relay 710 opens contacts 711 and closes contacts 712 to reconnect the ring conductor R7 to retard coil 730. Pulsing relay 740 released when contacts 711 open. Off-normal relay 720 restores closing contacts 724 to maintain (−) battery on conductor CX1. The circuit to shunt relay 840 is opened at contacts 743 and 726; therefore it releases.

*Sec. 28. Called party answers*

When the called party in dial tributary office 103 answers, the polarity of the CX1 conductor is transferred from ground to (−) battery thereby shunting supervisory relay 750 which releases, the shunt path including contacts 612 and 724. Responsive thereto, contacts 753 open to remove the connection extended from grounded (+) on contacts 838 through the low resistance winding of sleeve relay 620 to conductor S7 thereby extinguishing the marginal supervisory lamp (not shown) at the operator's position. The circuit is released in the manner described above in section 24.

*Sec. 29. Call from outgoing selector 125 to dial tributary office 103*

Outgoing selector 125 has access to dial tributary trunk circuit 115 by way of conductors T6, R6, S6 and HS6. As a seizure signal, selector 125 closes a loop across conductors T6 and R6 thereby operating calling bridge relay 820, the circuit being completed from conductor T6 through contacts 613', the upper winding of repeat coil RC603 and contacts 618 to grounded (+) by way of the upper winding of calling bridge relay 820. The ring side of the line is connected from conductor R6 through contacts 611', the lower winding of RC603 and contacts 616 to (—) battery by way of the lower winding of calling bridge relay 820. It operates and closes an obvious circuit at contacts 822 for operating release delay relay 830. At contacts 821, a circuit is prepared for pulsing over dial leg CX1. Release delay relay 830 operates and closes an obvious circuit over contacts 837 to a second release delay relay 810. At contacts 836, a circuit is prepared for shunt relay 840 which circuit will be completed when calling relay falls back to close contacts 823 during pulsing.

Dial tributary trunk circuit 115 is now marked as busy. That is, a circuit is closed for sleeve slave relay 640 over the path extending from (—) battery by way of the winding of relay 640 to grounded (+) through contacts 834 and 622. The test sleeve conductor TS is marked busy in parallel with the circuit for operating relay 640. Dial tributary trunk circuit 115 is marked busy to operator's position 110 (Fig. 6) since sleeve slave relay 640 closes contacts 646 lighting busy lamp L601 and since contacts 831 open and 832 close thereby switching the circuit extending from sleeve conductor S7 through the high resistance winding of sleeve relay 620 from grounded (+) through resistance R801 to (—) battery. Contacts 831 render relay 620 inoperative and contacts 832 apply means for transmitting an audible test over sleeve S7. When sleeve slave relay 640 operates, a circuit is completed from conductor S6 through contacts on the make busy key and contacts 644 to grounded (+) by way of operated contacts 835. This marking serves to hold outgoing selector 125 and its associated switch train operated as well as to mark dial tributary trunk 115 as busy to other selectors. Contacts 642 open to remove the grounded (+) marking extended from the make busy key to the all trunks busy conductor.

A circuit is prepared to repeat dial pulses, which are extended over conductors T6 and R6, to conductor CX1 and hence the dial tributary office. When release delay relay 810 operates, dial leg conductor CX1 is transferred from grounded (+) extended through the winding of signal relay 850, contacts 811 and 611 to (—) battery through the winding of supervisory relay 750 by way of contacts 724, 821, 812 and 611. Supervisory relay 750 operates to close contacts 751 thereby operating sleeve slave relay 630, the circuit including (—) battery applied through the lower winding of relay 630, contacts 751 and 814 to grounded (+) by way of contacts 835. Contacts 752 are closed thereby establishing a holding circuit from grounded (+) through contacts 843 and 752 to the lower winding of relay 750 and (—) battery.

*Sec. 30. Dialing*

The circuit is now prepared for receipt of dial pulses which are transmitted from a calling operator position (not shown) through outgoing selector 125. Each of these dial pulses is in the form of break pulses in the bridge completing the loop across conductors T6 and R6. Responsive to the first break in the loop, calling bridge relay 820 releases since it had been holding from grounded (+) through the upper winding of relay 820, contacts 618, the upper winding of repeat coil RC603 and contacts 613' to conductor T6 through a bridge (not shown) across the loop in outgoing selector 125 and back by way of conductor R6, contacts 611', the lower winding of repeat coil RC603 and contacts 616 to (—) battery by way of the lower winding of calling bridge relay 820. Responsive to its release, calling bridge relay 820 closes contacts 823 thereby completing a circuit through contacts 836 for operating shunt relay 840. It, in turn, opens contacts 847 and 845, and closes contacts 846 and 844 thereby completing a direct metallic pulsing path through contacts 618 and 616 to calling bridge relay 820 to prevent distortions in the outgoing pulse train which would be occasioned by the inductance of repeat coil RC603.

Calling bridge relay 820 follows each digit pulse and responsive thereto opens contacts 821 to repeat the pulses in the form of breaks in the circuit normally extended from (—) battery through the winding of supervisory relay 750, contacts 724, 821, 812 and 611 to dial leg CX1. Equipment in the distant office responds and a suitable switch train is set to seize the called party. During each break period, contacts 822 are opened, and during each make period, contacts 823 are opened; however, due to their slow release characteristics, neither release delay relay 830 nor shunt relay 840 release. At the end of each digit pulse train, contacts 823 remain open long enough to release shunt relay 840 thereby re-establishing the talking connection to dial tributary office 103. The circuit to supervisory relay 750 extends through contacts 724 and 821 to conductor CX1. Since contacts 821 are opened and closed to repeat the pulsing, the circuit for relay 750 is alternately broken; however, it does not release at this time due to the holding circuit through contacts 843 and 752 as well as the slow release effect produced by its short-circuited lower winding.

Following the last digit pulse, the circuit to shunt relay 840 is held open by contacts 823 so that it releases and the talking circuit is completed at contacts 845 and 847 to the distant office. Relay 820 remains operated by way of contacts 618 and 616, the connection through repeat coil RC 603 and contacts 611' and 613' to conductors T6 and R6.

*Sec. 31. Called party answers*

When the called party answers, the dial tributary office transfers dial leg CX1 to resistance battery allowing the release of supervisory relay 750, i. e., (—) battery is now connected from conductor CX1 through contacts 611, 812, 821 and 724 through the winding of supervisory relay 750 to (—) battery. Responsive to the release of relay 750, contacts 754 are opened and contacts 755 are closed to switch the polarity of conductor HS6 thereby giving answer supervision over selector 125 to the calling operator. Conversation follows.

*Sec. 32. Release*

When the called party disconnects first, dial leg conductor CX1 is returned to grounded (+) by dial tributary office. Supervisory relay 750 operates to open contacts 755 and close contacts 754 thereby switching the polarity of conductor HS6 which is used to give disconnect supervision to preceding equipment. When the calling party disconnects first, or when outgoing selector 125 releases responsive to disconnect supervision, the loop circuit across conductors T6 and R6 is broken thereby releasing calling bridge relay 820, contacts 823 close to operate shunt relay 840 and contacts 822 open to restore release delay relay 830. It should be noted that shunt relay 840 operated during the slow release interval of release delay relay 830 while contacts 836 were still closed; therefore, after a brief interval, contacts 836 are opened to de-energize shunt relay 840. However, it too requires some time to release; therefore, for a brief interval between the release of relays 830 and 840, a circuit is completed from the peg count meter through contacts 641, 841, 833 and 622 to grounded (+). Release delay relay 830 also opens contacts 837 thereby restoring release delay relay 810. Release delay relay 830 also opens contacts 834 thereby restoring sleeve slave relay 640. The circuit is now returned to normal and all busy markings are removed.

When relay 810 releases to open contacts 812 and close contacts 811, dial leg CX1 is returned to a marking of grounded (+) extended through the winding of signal relay 850 thereby giving disconnect supervision to the distant office.

*Sec. 33. Adapter circuit 117*

Sections 22–32 of the specification have described various calls which may be extended through dial tributary trunk circuit 115 since it functions the same without regard as to whether the call is by way of adapter circuit 117 or direct to conventional equipment. Now there will follow a description of how adapter 117 operates with reference being made to suitable portions of the preceding specification for the operation of dial tributary trunk circuit 115. This adapter uses positive-negative signaling.

When adapter circuit 117 is seized from distant office 102, ringing current is applied over two-way line conductors T9 and R9 to repeat coil RC901. This ringing current is connected through contacts 963 and 965 to conductors H1 and D1 where rectifier R902 converts the ringing current to a D. C. current so that ring-up relay 950 may operate and close contacts 951 thereby completing a circuit to ring-up relay 940 via thermistor T903 and in parallel therewith a circuit is closed from (—) battery through contacts 951 and thermistor T903 to grounded (+) through sleeve relay 930. After a brief interval of time marked by the resistance characteristics of thermistor T903, relays 930 and 940 operate. This time interval is provided to prevent operation on the occurrence of transient currents having the characteristics of ringing current. Sleeve relay 930 closes contacts 931 and ring-up relay 940 locks over the path including the contacts 931 and 948 as well as contacts 927 and 943. Means is provided for connecting grounded (+) through the low resistance winding of sleeve relay 930, contacts 932, sleeve conductor SL and through the low resistance winding of sleeve relay 620 to conductor S7. This circuit has no effect at this time; however, after the operator plugs into jack J602, a marginal lamp (not shown) at position 110 (Fig. 6) will light. Ring-up relay 940 operates and applies grounded (+) to conductor S6 for holding dial tributary trunk circuit 115 busy to outgoing selectors. This marking extends over a path which may be traced from contacts 941 through contacts 921 to conductor S6, and contacts of the make busy key to outgoing selector 125. Contacts 942 are closed for extending a (—) battery marking over conductor BL to light busy lamp L601 at operator position 110 (Fig. 6). Thermistor T903 is shunted at contacts 947 since its characteristics are no longer required. Contacts 945 are opened and contacts 946 are closed to prepare a circuit to dial leg conductor CX1. Contacts 944 are closed for discharging capacitor C904 which formerly charged over the circuit extending from (—) battery through capacitor C904, resistor R905, contact 924 and 943 to grounded (+). Contacts 946 prepare a path for signal relay 910.

When ringing current is removed from across repeat coil RC901, ring-up relay 950 releases closing contacts 952. Contacts 951 open and sleeve relay 930 releases to open contacts 932 and 931; however, ring-up relay 940 continues to be held from contacts 927. A circuit is now completed for extending a (—) battery marking over contacts 952, 949 and 929 to conductor CX1 thereby operating signal relay 850 over the circuit including contacts 611 and 811. The operator at position 110 is signaled when contacts 854 close to extend (—) battery over contacts 635 to conductor LL, thereby lighting incoming lamp L602.

The operator notes the lit condition of lamp L602 and proceeds to make a suitable plug and jack connection responsive to which sleeve relay 620 and in turn switch relay 610 operate as described above in section 26. Responsive thereto, (—) battery is transmitted through the upper winding of supervisory relay 750, contacts 724 and 612 to conductor CX1, contacts 926 and the winding of signal relay 910 to grounded (+). It operates and closes contacts 911 thereby operating signal slave relay 920 over an obvious circuit following which a circuit is completed for extending a grounded (+) marking over conductor CX1. This circuit may be traced from conductor CX1 through contacts 928 and 942′ to grounded (+). At contacts 921, the grounded (+) marking is removed from conductor S6 since a duplicate busy marking is now extended through dial tributary trunk circuit 115. Relay 920 locks at contacts 922. Rering relay 960 is connected through contacts 912 and 923 to capacitor C904; however, since it was previously discharged by the closing of contacts 944, nothing happens at this time. Contacts 927 are opened to release ring-up relay 940 which holds for a brief interval due to its slow release characteristics.

It should be noted that signal relay 910 originally operated from (—) battery extended over conductor CX1 and contacts 926 which are opened when signal slave relay 920 operated. However, relay 910 did not release because it had a holding path via contacts 925 and 946 to (—) battery. Now, after ring-up relay 940 has released, a holding path is complete from grounded (+) through the winding of signal relay 910, contacts 925, 945, 941′ and 928 to conductor CX1. Thus, relays 910 and 920 are operated during the call.

*Sec. 34. Release*

When the calling party in office 102 disconnects, ringing current is momentarily extended over conductors T9 and R9, through repeat coil RC901 and conductors H1 and D1 to rectifier R902 where it is where it is converted to D. C. for operating ring-up relay 950. Contacts 951 are closed to operate ring-up relay 940 and in parallel therewith sleeve relay 930 following an interval marked by the characteristics of thermistor T903. Sleeve relay 930 closes contacts 932 for extending a low resistance grounded (+) marking over conductor SL, to the low resistance winding of relay 620 and conductor S7 thereby lighting a marginal lamp (not shown) at operator position 110 (Fig. 6). When ringing current is removed from the line, ring-up relay 950 releases. Relay 930 stays operated until the operator operates her talking key, thereby inserting extra resistance into conductor S7, thus releasing marginal relay 930 and in turn relay 940. This operation is similar to that described above in section 19 wherein resistance R405 was substituted for L403 causing the release of relay 530.

Responsive to the receipt of disconnect instructions from distant office 102, the operator at position 110 (Fig. 6) disconnects the plug and jack following which sleeve relay 620 and switch relay 610 release, contacts 612 open and 611 close so that conductor CX1 is returned to grounded (+) marking by way of contacts 611, 811 and the winding of signal relay 850. Responsive thereto, signal relay 910 releases and opens contacts 911 thereby releasing signal slave relay 920. When contacts 924 are closed, capacitor C904 is recharged. The circuit is now available for other calls.

*Sec. 35. Rering*

If the operator at position 110 (Fig. 6) wishes to recall the operator in office 102, (—) battery is applied by any suitable means to conductor T7, contacts 612′, the upper winding of repeat coil RC603 and contacts 617 to grounded (+) through the winding of off-normal relay 710 which operates. Responsive thereto, contacts 711 are operated; however, pulsing relay 740 does not operate since grounded (+) is not connected to conductor R7. Since pulsing relay 740 does not operate contacts 742 are not closed; hence, off-normal relay 720 does not operate. Therefore, a path may be traced from grounded (+) through contacts 727 and 713 to operate rering relay 960 via contacts 923 and 912. This same grounded (+) charges capacitor C904. Contacts 966 close to complete an idle line termination IT across conductors T8 and R8. The talking path is broken at contacts 963 and 965. The ringing generator is started at contacts 961. Ringing current is now transmitted through contacts 964 and 962 to repeat coil RC901 and over conductors T9 and R9 to distant office 102. When the operator restores her ringing key, relay 960 is returned to normal removing the application of ringing current; however, it should be noted that relay 960 does not restore until capacitor C904 is fully discharged via contacts 923 and 912 thus assuring a full period of ringing current. Thus, capacitor C904 provides means for timing the duration of applied ringing current.

*Sec. 36. Outgoing call to distant office 102*

Outgoing calls may be extended from selector 125 or from operator position 110 (Fig. 6). In either event, conductor CX1 is switched to a (−) battery marking responsive to which signal relay 910 operates via contacts 926. Contacts 911 are closed to operate signal slave relay 920. A circuit is now completed from (−) battery through capacitor C904, resistance R905, contacts 923 and 912 to (−) battery by way of the winding of rering relay 960. It will be observed that just previous to the operation of signal relays 910 and 920 a circuit was closed over contacts 943 and 924 to charge capacitor C904. Therefore, the discharging path now completed through contacts 923 and 912 operates rering relay 960 and contacts 961 close to start the ringing generator. Contacts 966 are closed to connect idle line termination IT across conductors T8 and R8. Contacts 962 and 964 are closed to transmit ringing current through repeat coil RC901 to distant office 102. When capacitor C904 is discharged after two seconds, rering relay 960 releases and ringing current is removed from across repeat coil RC901. Equipment in distant office 102 is effective for utilizing this timed two second period of ringing current as a seizure signal, following which connections may be made in office 102 so that conversation may follow.

*Sec. 37. Release*

When the called party disconnects, the application of ringing current to conductors T9 and R9 is effective for operating ring-up relay 950 and the circuit is released as described above in section 34.

MISCELLANEOUS

Various elements have been shown in my circuit drawings which have not been explained elsewhere in the specification since their operation is obvious to those skilled in the art. For example, I have shown several make busy keys which may be controlled manually to mark the equipment busy as desired. I have also shown conventional capacitor-resistance spark protection networks which are labeled "SP." Connections to the usual test equipment are shown but not explained since this particular feature is well known and is not being claimed.

While I have shown and described a specific embodiment of my invention, it should be obvious that one skilled in the art could make various changes and modifications without departing from the true spirit of my invention. Therefore, in the appended claims, I intend to cover not only the specific circuit shown but also such other modifications as may be obvious to those skilled in the art.

What I claim is:

1. In a telephone system, an intertoll dial office having a dial-to-dial trunk circuit therein, a ring-down manual office, each office including means for transmitting signals conventional to its own equipment, a two-way trunk line terminated by said dial-to-dial trunk circuit and said manual office, means for transmitting said signals via said trunk line between said offices, adapter means connected in said trunk line between said trunk circuit and said manual office for converting said signals into a form which is useable at the office to which said signals are transmitted.

2. In a telephone system, an intertoll dial office having a dial-to-dial trunk circuit therein, said dial office comprising polar-duplex intertoll dial signal equipment, a ring-down manual office, each office including means for transmitting signals conventional to its own equipment, a two-way trunk line terminated by said dial-to-dial trunk circuit and said manual office, means for transmitting said signals via said trunk line between said offices, adapter means connected in said trunk line between said trunk circuit and said manual office, said adapter comprising means for converting said polar-duplex signals into timed periods of ringing current, and for converting periods of ringing current into polar-duplex signals.

3. In a telephone system, an intertoll dial office having a dial-to-dial trunk circuit therein, said dial office comprising positive-negative dial signal equipment, a ring-down manual office, each office including means for transmitting signals conventional to its own equipment, a two-way trunk line terminated by said dial-to-dial trunk circuit and said manual office, means for transmitting said signals via said trunk line between said offices, adapter means connected in said trunk line between said trunk circuit and said manual office, said adapter means comprising means for converting positive-negative signals into timed periods of ringing current, and for converting periods of ringing current into positive-negative signals.

4. In a telephone system, an intertoll dial office comprising an operator's position, a trunk circuit, an adapter circuit, a relay in said trunk circuit and a relay in said adapter circuit, a control conductor extending from said operator's position through said adapter circuit to said trunk circuit and connecting each of said relays in series, a source of potential having at least two terminals, a lamp, means including said lamp for normally connecting one of said terminals to said conductor at said operator position, a two-way line, a manual office comprising means for transmitting signals to said adapter circuit over said line, connecting means controlled by said adapter for completing a circuit from the other of said terminals to said conductor responsive to the receipt of said signals, whereby at least said relay in said adapter circuit operates and said lamp is lit, a resistor, and means at said operator's position for substituting said resistor for said lamp, the characteristics of said resistor and said relays being such that said relay in said adapter circuit releases responsive to the potential drop resulting from said substitution of said resistor for said lamp.

5. The telephone system of claim 4 and thermistor means for delaying the operation of said connecting means for a brief interval.

6. The telephone system of claim 5 wherein said signals comprise timed periods of ringing current received from said manual office over said line.

7. An adapter circuit for interconnecting an intertoll dial office and a manual office comprising incoming and outgoing terminals, a capacitor, means for charging said capacitor, a source of ringing current, a relay, contacts on said relay for connecting said source of ringing current to said outgoing terminals, means for transmitting polar-duplex signals over said incoming terminals into said adapter, and means responsive to said signals for connecting said capacitor to operate said relay whereby ringing current is connected to said output terminals for the discharge time of said capacitor.

8. An adapter circuit for interconnecting an intertoll dial office and a manual office comprising incoming and outgoing terminals, a capacitor, means for charging said capacitor, a source of ringing current, a relay, contacts on said relay for connecting said source of ringing current to said outgoing terminals, means for transmitting positive-negative signals over said incoming terminals into said adapter, and means responsive to said signals for connecting said capacitor to operate said relay whereby ringing current is connected to said output terminals for the discharge time of said capacitor.

9. An adapter circuit for interconnecting an intertoll dial office and a manual office comprising incoming and outgoing terminals, a capacitor, means for charging said capacitor, a source of ringing current, a relay, contacts on said relay for connecting said source of ringing current to said outgoing terminals, an idle line termination, other contacts on said relay for connecting said idle line termination to said incoming terminals, means for transmitting intertoll dial signals into said adapter, and means responsive to said signals for connecting said capacitor to operate said relay whereby said ringing current is connected to said output terminals and said idle line termination is connected to said input terminals for the discharge time of said capacitor.

10. A telephone system comprising an intertoll office, a dial-to-dial trunk circuit, means for seizing said trunk circuit from said intertoll office, a second manual office, a two-way line interconnecting said trunk circuit and said second office, an adapter means, means for connecting said adapter in said interconnection between said trunk circuit and said second office, means in said trunk circuit for receiving conventional control signals from said intertoll office, means in said trunk circuit for repeating said signals to said adapter, means in said adapter for converting said repeated signals into other signals which can be used by said second office, and means for transmitting said other signals to said second office.

11. The telephone system of claim 10 and means in said adapter for receiving ringing current from said second office, means in said adapter responsive to said ringing current for transmitting supervisory signals to said trunk circuit, and means in said trunk circuit for repeating said supervisory signals to said intertoll office.

12. The telephone system of claim 11 in which said repeated dial and control signals are polar-duplex signals.

13. The telephone system of claim 11 in which said repeated dial and control signals are positive-negative signals.

14. The telephone system of claim 11 wherein said other signal is ringing current, and means for transmitting said other signals for a predetermined time interval.

15. The telephone system of claim 11 and thermistor means for delaying said adapter's response to said ringing current.

16. The telephone system of claim 11 and an idle line termination and means for connecting said idle line termination to said trunk circuit during the transmission of said other signal.

17. The telephone system of claim 11 and a control conductor connected from said intertoll office through said adapter to said trunk circuit, a first relay in said adapter circuit and a second relay in said trunk circuit, each of said relays having a winding in series with said control conductor, a source of potential having two terminals, a lamp, means in said intertoll office for normally connecting one of said terminals to said conductor via said lamp, means in said adapter responsive to said ringing current for connecting the other of said terminals to said conductor whereby at least said first relay is operated and said lamp is lit, a resistor, and operator controlled means for substituting said resistor for said lamp, the characteristics of said resistor and said relays being such that said first relay releases responsive to the potential drop resulting from said substitution of said resistance for said lamp.

18. A telephone system comprising an intertoll office, an intertoll dial-to-dial trunk circuit, means for seizing said trunk circuit from said intertoll office, a second manual office, an adapter means, means for interconnecting said adapter between said trunk circuit and said second office, means in said trunk circuit for receiving control signals from said intertoll office, means in said trunk circuit for repeating said signals to said adapter, means in said adapter for receiving said repeated signals, means in said adapter for converting said repeated signals into periods of ringing current which can be used by said second office, means for transmitting said ringing current to said second office for a predetermined time interval, means in said adapter for receiving incoming ringing current signals from said second office, means for delaying said adapter's response to said ringing current signals, means in said adapter responsive after said delay to said incoming ringing current for transmitting intertoll dial signals to said trunk circuit and means in said trunk circuit for repeating said signals to said intertoll office.

19. A telephone system comprising an intertoll dial office, an intertoll dial-to-dial trunk circuit, means for seizing said trunk circuit from said intertoll office, a manual office, means for interconnecting said trunk circuit and said manual office, an adapter means, means for connecting said adapter in said interconnection between said trunk circuit and said manual office, means in said trunk circuit for receiving control signals from said intertoll office, means in said trunk circuit for repeating said signals over said interconnection, means in said adapter for converting said repeated signals into other signals which can be used by said manual office, means for transmitting said other signals to said manual office for a predetermined time interval, an idle line termination, means for connecting said idle line termination to said trunk circuit during said transmission of said other signal, means in said manual office for transmitting ringing current, means in said adapter for receiving said ringing current transmitted from said manual office, means in said adapter responsive to said ringing current for transmitting supervisory signals to said trunk circuit and means in said trunk circuit for repeating said supervisory signals to said intertoll office.

20. A telephone system comprising an intertoll office, an intertoll dial-to-dial trunk circuit, means for seizing said trunk circuit from said intertoll office, a ring-down office, means for interconnecting said trunk circuit and said ring-down office, an adapter means, means for series connecting said adapter in said interconnection, means in said trunk circuit for receiving conventional signals from said intertoll office, means in said trunk circuit for repeating said signals over said interconnection, means in said adapter for receiving said repeated signals, means in said adapter for converting said repeated signals into ring-down signals which can be used by said second office, means for transmitting said ring-down signals to said ring-down office for a predetermined time interval, means in said adapter for receiving ringing current from said distant office, means in said adapter responsive to said ringing current for transmitting signals to said trunk circuit, a control conductor connected from said intertoll office through said adapter to said trunk circuit, a first relay in said adapter circuit and a second relay in said trunk circuit, each of said relays having a winding in series with said control conductor, a source of potential having two terminals, a lamp, means in said intertoll office for normally connecting one of said terminals to said conductor via said lamp, means in said adapter responsive to said ringing current for connecting the other of said terminals to said conductor whereby at least said first relay is operated and said lamp is lit, a resistor, and operator controlled means for substituting said resistor for said lamp, the characteristics of said resistor and said relays being such that said first relay releases responsive to the potential drop resulting from said substitution of said resistance for said lamp.

21. A telephone system comprising an intertoll office, an intertoll dial-to-dial trunk circuit, means for seizing said trunk circuit from said intertoll office, a second office, means for interconnecting said trunk circuit and said second office, an adapter means, means for including said adapter in series with said interconnections, means in said trunk circuit for receiving signals from said intertoll office, means in said trunk circuit for repeating said signals to said adapter, means in said adapter for converting said repeated signals into other signals which can be used by said second office, means for transmitting said other signals to said second office, an idle line termination, means for connecting said idle line termination to said trunk circuit during the transmission of said other signal, means in said adapter for receiving ringing current from said second office, means for delaying said adapter's response to said ringing current, means in said adapter responsive after said delay to said ringing current for transmitting signals to said trunk circuit, and means in said trunk circuit for repeating said signals to said intertoll office.

22. A telephone system comprising an intertoll office, an intertoll dial-to-dial trunk circuit, means for seizing said trunk circuit from said intertoll office, means for interconnecting said trunk circuit and a second office, an adapter means, means for including said adapter in said interconnection, means in said trunk circuit for receiving signals from said intertoll office, means in said trunk circuit for repeating said signals over said interconnection to said adapter, means in said adapter for converting said repeated signals into other signals which can be used by said second office, means for transmitting said converted signals to said second office, means in said adapter for receiving ringing current from said second office, means for delaying the response of said adapter to said ringing current, means in said adapter responsive after said delay to said ringing current for transmitting signals to said trunk circuit, a control conductor extending from said intertoll office through said adapter to said trunk circuit, a relay in said adapter circuit having a winding in series with said control conductor, a source of potential having two terminals, a lamp, means in said intertoll office for connecting one of said terminals to said conductor via said lamp, means in said adapter responsive after said delay to said ringing current for connecting the other of said terminals to said conductor whereby said relay is operated and said lamp is lit, a resistor, and operator controlled means for substituting said resistor for said lamp, the characteristics of said resistor and said relay being such that said relay releases responsive to the potential drop resulting from said substitution of said resistance for said lamp.

23. A telephone system comprising an intertoll office, an intertoll dial-to-dial trunk circuit, means for connecting said trunk circuit to said intertoll office, a distant office, an adapter means, means for connecting said adapter between said trunk circuit and said distant office, means in said intertoll office for transmitting signals through said trunk circuit, means in said adapter for receiving said signals, means in said adapter for converting said signals into other signals which can be used by said distant office, means for transmitting said converted signals to said distant office, an idle line termination, means for connecting said idle line termination to said trunk circuit during the transmission of said converted signal, means in said adapter for receiving ringing current from said distant office, means in said adapter responsive to said ringing current for transmitting signals to said trunk circuit, a control conductor connected from said intertoll office through said adapter to said trunk circuit, a relay in said adapter circuit having a winding in series with said control conductor, a source of potential having two terminals, a lamp, means in said intertoll office for connecting one of said terminals to said conductor via said lamp, means in said adapter responsive to said ringing current for connecting the other of said terminals to said conductor whereby said relay is operated and said lamp is lit, a resistor, and operator controlled means for substituting said resistor for said lamp.

24. A telephone system comprising an intertoll office, an intertoll dial-to-dial trunk circuit, means for seizing said trunk circuit from said intertoll office, a ring-down manual office, an adapter means, means for connecting said adapter between said trunk circuit and said manual office, means in said trunk circuit for receiving and repeating intertoll control signals from said intertoll office, means in said adapter for receiving said repeated signals, means in said adapter for converting said repeated signals into ring-down signals, means for transmitting said ring-down signals to said manual office for a given period of time, an idle line termination and means for connecting said idle line termination to said trunk circuit during the transmission of said ring-down signal, means in said adapter for receiving ringing current signals from said distant office, means for delaying said adapter's response to said ringing current, and means in said adapter responsive after said delay to said ringing current for transmitting intertoll supervisory signals to said trunk circuit.

25. A telephone system comprising an intertoll office, an intertoll trunk circuit, means for seizing said trunk circuit from said intertoll office, a ring-down office, means for interconnecting said trunk circuit and said ring-down office, an adapter means, a two-way connection extending from said intertoll office through said trunk circuit and said adapter to said ring-down office, means in said trunk circuit for receiving signals from said intertoll office, means in said trunk circuit for repeating said signals over said connection, means in said adapter for receiving said repeated signals, means in said adapter for converting said repeated signals into ring-down signals, means for transmitting said ring-down signals to said ring-down office for a given time interval, means in said adapter for receiving ringing current from said distant office, means for delaying said adapter's response to said ringing current, means in said adapter responsive after said delay to said ringing current for transmitting signals to said trunk circuit, a control conductor connected from said intertoll office through said adapter to said trunk circuit, a relay in said adapter circuit having a winding in series with said control conductor, a source of potential having two terminals, a lamp, means in said intertoll office for connecting one of said terminals to said conductor via said lamp, means in said adapter responsive after said delay to said ringing current for connecting the other of said terminals to said conductor whereby said relay is operated and said lamp is lit, a resistor, and operator controlled means for substituting said resistor for said lamp, the characteristics of said resistor and said relay being such that said relay releases responsive to the potential drop resulting from said substitution of said resistance for said lamp.

26. A telephone system comprising a first office, a trunk circuit, means for seizing said trunk circuit from said first office, a second office, means for interconnecting said trunk circuit and said second office, an adapter means, means for including said adapter in said interconnections, means in said trunk circuit for receiving signals from said first office, means in said trunk circuit for repeating said signals over said interconnection, means in said adapter for receiving said repeated signals, means in said adapter for converting said repeated signals into other signals which can be used by said second office, means for transmitting said converted signals to said second office over a measured time period, an idle line termination, means for connecting said idle line termination to said trunk circuit during the transmission of said converted signal, means in said adapter for receiving signaling current from said second office, means in said adapter responsive to said signaling current for transmitting signals to said first office, a control conductor extending from said intertoll office through said adapter and said trunk circuit, a relay in said adapter circuit having a winding connected in series with said control conductor, a source of potential having two terminals, means in said intertoll office including a lamp for normally connecting one of said terminals to said conductor, means in said adapter responsive to said signaling current for connecting the other of said terminals to said conductor whereby said relay is operated and said lamp is lit, a resistor, and operator controlled means for substituting said resistor for said lamp, the characteristics of said resistor and said relay being such that said relay releases responsive to the potential drop resulting from said substitution of said resistance for said lamp.

27. A telephone system comprising an intertoll dial office; an intertoll trunk circuit; means for seizing said trunk circuit from said intertoll office; a ring-down manual office; an adapter; means for interconnecting said intertoll office, said trunk circuit, said adapter and said ring-down office; means in said trunk circuit for receiving dial and control signals from said intertoll dial office; means in said trunk circuit for repeating said signals over said interconnection to said adapter; means in said adapter for receiving said repeated signals, means in said adapter for converting said repeated signals into ring-down signals which can be used by said ring-down office, means for transmitting said ring-down signals to said ring-down office; an idle line termination, means for connecting said idle line termination to said trunk circuit during the transmission of said ring-down signal; means in said adapter for receiving ringing current from said ring-down office, means for delaying said adapter's response to said ringing current, means in said adapter responsive after said delay to said ringing current for transmitting signals to said trunk circuit; a control conductor connected from said intertoll office through said adapter to said trunk circuit, a relay in said adapter circuit having a winding in series with said control conductor, a source of potential having two terminals, a lamp, means in said intertoll office for connecting one of said terminals to said conductor via said lamp, means in said adapter responsive after said delay to said ringing current for connecting the other of said terminals to said conductor whereby said relay is operated and said lamp is lit, a resistor, and operator controlled means for substituting said resistor for said lamp, the characteristics of said resistor and said relay being such that said relay releases responsive to the potential drop resulting from said substitution of said resistance for said lamp.

28. A telephone system comprising an intertoll office, an intertoll trunk circuit, means for seizing said trunk circuit from said intertoll office, a ring-down manual office, means for interconnecting said trunk circuit and said manual office, an adapter means, means for including said adapter in series with said interconnection, means in said trunk circuit for receiving dial and control signals from said intertoll office, means in said trunk circuit for repeating said signals over said interconnection, means in said adapter for receiving said repeated signals, means in said adapter for converting said repeated signals into ring-down signals which can be used by said second office, means for transmitting said ring-down signals to said distant office for a predetermined time interval, an idle line termination, means for connecting said idle line termination to said trunk circuit during the transmission of said ring-down signal, means in said adapter for receiving ringing current from said distant office, means for delaying said adapter's response to said ringing current, means in said adapter responsive after said delay to said ringing current for transmitting supervisory signals to said trunk circuit, a control conductor connected from said intertoll office through said adapter to said trunk circuit, a first relay in said adapter circuit and a second relay in said trunk circuit, each of said relays having a winding in series with said control conductor, a source of potential having two terminals, a lamp, means in said intertoll office for connecting one of said terminals to said conductor via said lamp, means in said adapter responsive after said delay to said ringing current for connecting the other of said terminals to said conductor whereby said first relay is operated and said lamp is lit, a resistor, and operator controlled means for substituting said resistor for said lamp, the characteristics of said resistor and said relays being such that said first relay releases responsive to the potential drop resulting from said substitution of said resistance for said lamp.

29. A telephone system comprising an intertoll dial office, a polar-duplex signaling trunk circuit, means for seizing said trunk circuit from said intertoll office, a ring-down office, two-way line means for interconnecting said trunk circuit and said ring-down office, an adapter circuit, means for connecting said adapter to said line between said trunk circuit and said ring-down office, means in said trunk circuit for transmitting polar-duplex dial and control signals to said adapter under the influence of said intertoll office, means in said adapter for receiving said signals, means in said adapter for converting said signals into ring-down signals, means for transmitting said ring-down signals to said ring-down office for a given period of time, an idle line termination, means for connecting said idle line termination to said trunk circuit during said transmission of said ring-down signal, means in said ring-down office for transmitting ringing current, means in said adapter for receiving ringing current from said ring-down office, means for delaying said adapter's response to said ringing current, means in said adapter responsive to said ringing current after said delay for transmitting polar-duplex signals to said trunk circuit, a control conductor connected from said intertoll office through said adapter to said trunk circuit, a relay in said adapter circuit having its winding connected in series with said control conductor, a source of potential having two terminals, means in said intertoll office including a lamp for normally connecting one of said terminals to said conductor, means in said adapter responsive to said ringing current after said delay for connecting the other of said terminals to said conductor whereby said relay is operated and said lamp is lit, a resistor, and operator controlled means for substituting said resistor for said lamp, the characteristics of said resistor and said relay being such that said relay releases responsive to the potential drop resulting from said substitution of said resistance for said lamp.

30. A telephone system comprising a dial office, a positive-negative signaling trunk circuit, means for seizing said trunk circuit from said office, means for transmitting positive-negative dial and control signals from said trunk circuit under the influence of said office, an adapter, means for connecting said adapter to said trunk circuit, means in said adapter for receiving said positive-negative signals, means in said adapter for converting said signals into other signals which can be used by a distant office, means for transmitting said other signals to said distant office for a given time period, an idle line termination, means for connecting said idle line termination to said trunk circuit during the transmission of said ring-down signal, means in said adapter for receiving signaling current from said distant office, means for delaying said adapter's response to said signaling current, means in said adapter responsive to said signaling current after said delay for transmitting positive-negative signals to said trunk circuit, a control conductor connected from said intertoll office through said adapter to said trunk circuit, a relay in said adapter circuit having a winding in series with said control conductor, a source of potential having two terminals, means in said intertoll office including a lamp for normally connecting one of said terminals to said conductor via said lamp, means in said adapter responsive to said signaling current after said delay for connecting the other of said terminals to said conductor whereby said relay is operated and said lamp is lit, a resistor, and operator controlled means for substituting said resistor for said lamp, the characteristics of said resistor and said relay being such that said relay releases responsive to the potential drop resulting from said substitution of said resistance for said lamp.

References Cited in the file of this patent

UNITED STATES PATENTS

| | | |
|---|---|---|
| 1,629,008 | Smith | May 17, 1927 |
| 1,922,879 | Burgener | Aug. 15, 1933 |
| 2,320,549 | Voss et al. | June 1, 1943 |
| 2,367,634 | Wicks et al. | Jan. 16, 1945 |
| 2,662,935 | Lesigne | Dec. 15, 1953 |
| 2,761,903 | Den Hertog | Sept. 4, 1956 |